United States Patent [19]

Fiorino

[11] 3,818,501

[45] June 18, 1974

[54] DETECTION OF DIGITAL DATA USING INTEGRATION TECHNIQUES

[75] Inventor: Benjamin C. Fiorino, Longmont, Colo.

[73] Assignee: International Business Machines Corporation, Armonk, N.Y.

[22] Filed: Apr. 23, 1973

[21] Appl. No.: 353,823

Related U.S. Application Data

[63] Continuation-in-part of Ser. No. 197,906, Nov. 11, 1971, which is a continuation-in-part of Ser. No. 76,145, Sept. 28, 1970, abandoned.

[52] U.S. Cl. .................................................. 360/40
[51] Int. Cl. .................................................. G11b 5/00
[58] Field of Search .............................. 340/174.1 H

[56] References Cited

UNITED STATES PATENTS

| | | | |
|---|---|---|---|
| 3,231,725 | 1/1966 | Davis et al. | 235/153 |
| 3,581,297 | 5/1971 | Behr et al. | 340/174.1 |
| 3,623,078 | 11/1971 | Whiring | 340/347 |
| 3,728,535 | 4/1973 | Dickman | 235/194 |

*Primary Examiner*—Vincent P. Canney
*Attorney, Agent, or Firm*—Herbert F. Somermeyer

[57] ABSTRACT

Data represented in digital signals is detected by integration techniques; each integration occurs over the entire detection or sample period. Recovery of each integration circuit occurs in a subsequent sample period. A pair of integration circuits forming one integrator is provided for each state of the digital signal with the integrators being alternately actuated. To determine data contained in the signal, an amplitude comparison is made between the output of the analog-OR of each integrator for the several signal states. Conversion circuits associated with each integrator enable detection of data from diverse signal formats. Phase errors are detected and indicated using the data detection circuitry.

19 Claims, 16 Drawing Figures

DETECTION OF DIGITAL DATA USING INTEGRATION TECHNIQUES

RELATED PATENTS AND APPLICATIONS

This application is a continuation-in-part of U.S. Pat. application Ser. No. 197,906, filed Nov. 11, 1971, which is a continuation-in-part of U.S. Pat. application Ser. No. 76,145, filed Sept. 28, 1970, and now abandoned.

Thompson U.S. Pat. No. 3,217,183 and Simanvicius U.S. Pat. No. 3,349,389 disclose detection of data bit waveforms using integration techniques. U.S. Pat. No. 3,548,327 discloses another data bit detection scheme using a plurality of integrators.

ADDITIONAL U.S. PATENTS CITED IN PARENT APPLICATIONS

Titcomb U.S. Pat. No. 3,582,882 (340–146.2) Hutton et al. U.S. Pat. No. 3,516,060 (340–149), Jones U.S. Pat. No. 3,241,078 (329–50), Bell U.S. Pat. No. 3,386,041 (329–102), and Gaines et al. U.S. Pat. No. 3,641,447 (329–50XR).

BACKGROUND OF THE INVENTION

The present invention relates to the detection of data represented in diverse waveforms, particularly those waveforms usually associated with magnetic recording and communication systems.

Detection of data represented in multidistinct state signals using integration techniques has many noise immunity advantages, as well as sensitivity enhancement, over detection schemes analyzing wavelengths. In many systems, the signal is limited to two distinct states, respectively, for representing ones or zeroes (NRZ). In the alternative, a change in signal state represents a one; while no change in state represents a zero (NRZI). Other data manifestations using multidistinct state signals are known, such as phase-encoded (PE), ternary, double-frequency encoded (DFE or FM) and the like. Because of desired so-called backward capability for digital magnetic recording systems, a detector preferably is easily adaptable to different data recording techniques.

As the data bit rate increases, there is a corresponding increased requirement in sensitivity and reliability of the detection schemes. Integration techniques to date used for detection of data in distinct-state signal waveforms require a portion of the data bit detection period for recovery to a reference potential. As the data bit period decreases in duration, i.e., the data bit rate is increasing, for a given squelch or recovery time, the percentage of the bit period used for squelching increases. Therefore, it is highly desirable that an integration data detection system be devised that obviates the squelch problem.

Phase error detection is an inherent part of the data detection process. Phase error detection does not contribute to the over-all reliability of the detector, but it can play an important roll in error correction. See Hinz, Jr., U.S. Pat. No. 3,639,900. A phase error indicator monitors the data detection process and supplies indications when the detection circuit output signals signify a phase shift approaching excessive phase shift. If a data error is detected (parity or otherwise), the signal processing system samples the phase error indication, inter alia, for probable track in error (error location). Once this indication is given, error correction apparatus performs an appropriate error correction. Additionally, independent phase shift or error detectors may be employed. It is desired that such phase error indication employ apparatus internally associated with data detection apparatus.

SUMMARY OF THE INVENTION

It is an object of the present invention to provide an improved data detection scheme usable with a digital data system, capable of detecting data from signals having different formats and particularly wherein detection of data includes integration techniques. The detection of data is such that the squelch time of the integrators does not detract from integration time during any data detection or sample period.

An apparatus using the present invention and adapted to be used with a signal having two distinct states has two pairs of integration circuits. Each pair of integration circuits is termed an integrator. For a three distinct state signal system, three integrators are used. Within each integrator, the integration circuits are alternately actuated during successively occurring detection periods. Usually, duration of the detection period corresponds to a data bit period of the waveform being detected. Clock signals synchronized with the data bit waveform alternately actuate the integration circuits in the respectve integrators. Each integrator in the system detects that portion of the data bit period or detection period occupied by the signal having a given distinct signal state. The integrated signals are then combined for analyzing the data bit waveforms. In a preferred form the output signals of the integration circuits of each integrator are combined in an analog-OR circuit. To analyze the data bit signal at the end of each sample period, the signals from each integrator are compared with the output signals of all other integrators.

According to one aspect of the invention, the squelch of the respective integration circuits occurs during the detection period immediately following each integration period. Squelch occurs in the next successive detection period. This arrangement maintains the output of the analog-OR circuit, and hence each integrator, at a relatively high value for a signal having the same distinct state during two successive detection periods.

In systems having high noise, a sensitive amplitude comparator detects small differences in integrated signals at the end of each detection period to detect data. According to the present invention, in the detection of a two-distinct-state signal, a cross-coupled Eccles-Jordan type of circuit or latch is used. During integration time, both active elements of the latch are disconnected from the power supply. The output of the analog-OR circuits is supplied as base input signals to the two active elements. At the end of each sample period, the power supplies are connected to the latch causing it to assume the stable state in accordance with the more positive analog-OR signal. Constant current sources power and discrimination circuit to further enhance detection repeatability.

According to another aspect of the invention, the input data bit waveform is supplied in a normal (+D) and complement (−D) form to respective integrators. A cell center clock having a period equal to twice the data bit period (each one-half cell center clock cycle equals a data bit period) selectively actuates integration circuits in the respective integrators. The cell center clock supplies complementary clock signals. A first integrator is selectively actuated by a plus-clock (+C) signals for integrating only the positive polarity portions of such input signal. In a similar manner, the negative portions (−D) of an input signal are integrated by a second integrator similarly actuated by the plus and minus clock signals. Integration is preferably in the same signal polarity. The analog-OR outputs of the integrators are then compared to determine which signal state occupied the greater portion of the sample period. In a system wherein the data bit waveform has more than two distinct states, there are separate signals supplied from the readback system to more than two pairs of data bit integrators.

The integrating detector detects NRZ data signals with no data translation required at either the input or output. In detecting phase encoded (PE) data signals, a data translation is required at the input which converts PE signals to NRZ signals. The translation requires that the signal-to-noise ratio established through the read path is not adversely affected. In detecting run-length NRZI encoded data, the translation from NRZ detected to NRZI detected data is at the output of the detector (output latch). The frequency modulated encoded signal is detected using the same integrating detector by performing the same translation previously mentioned for PE and NRZI at the input and output, respectively. Using one integrating detector to detect any one of the several data record encoding schemes without degrading the inherent noise rejection capabilities of an integrating detector provides greater economy and flexibility of operation.

The integrating detector of this invention inherently indicates phase errors for all data signal formats. A phase error indicator responds to the integrated signal amplitudes to indicate phase shift between the data signal and the clock signal. That is, data content is indicated by the integrated signal amplitudes which simultaneously and inherently indicate phase relationships between clock and data signals. This fact stems from the synchronous demodulation aspects of the detector. Such relationship is inherently affected by phase shifts in the data signal, hence, also indicate data signal phase shifts.

The voltage developed across the integrating capacitors of the detector indicate possible error conditions (excessive phase shift or phase error). The error indication is given when the voltage difference between the integrating capacitors for plus and minus data at the end of each integration cycle approaches zero. This condition occurs when phase misalignment between clock and data approaches 50 per cent of a bit period. This phase shift can be caused by perturbations in the data signal or clock drift. The phase error indicator preferably has a variable threshold level where it could be varied to sense any percentage phase shift desired. There can be a different threshold set for write and read operations.

The foregoing and other objects, features and advantages of the invention will be apparent from the following more particular description of a preferred embodiment of the invention, as illustrated in the accompanying drawing.

GENERAL DESCRIPTION

Figure 1:
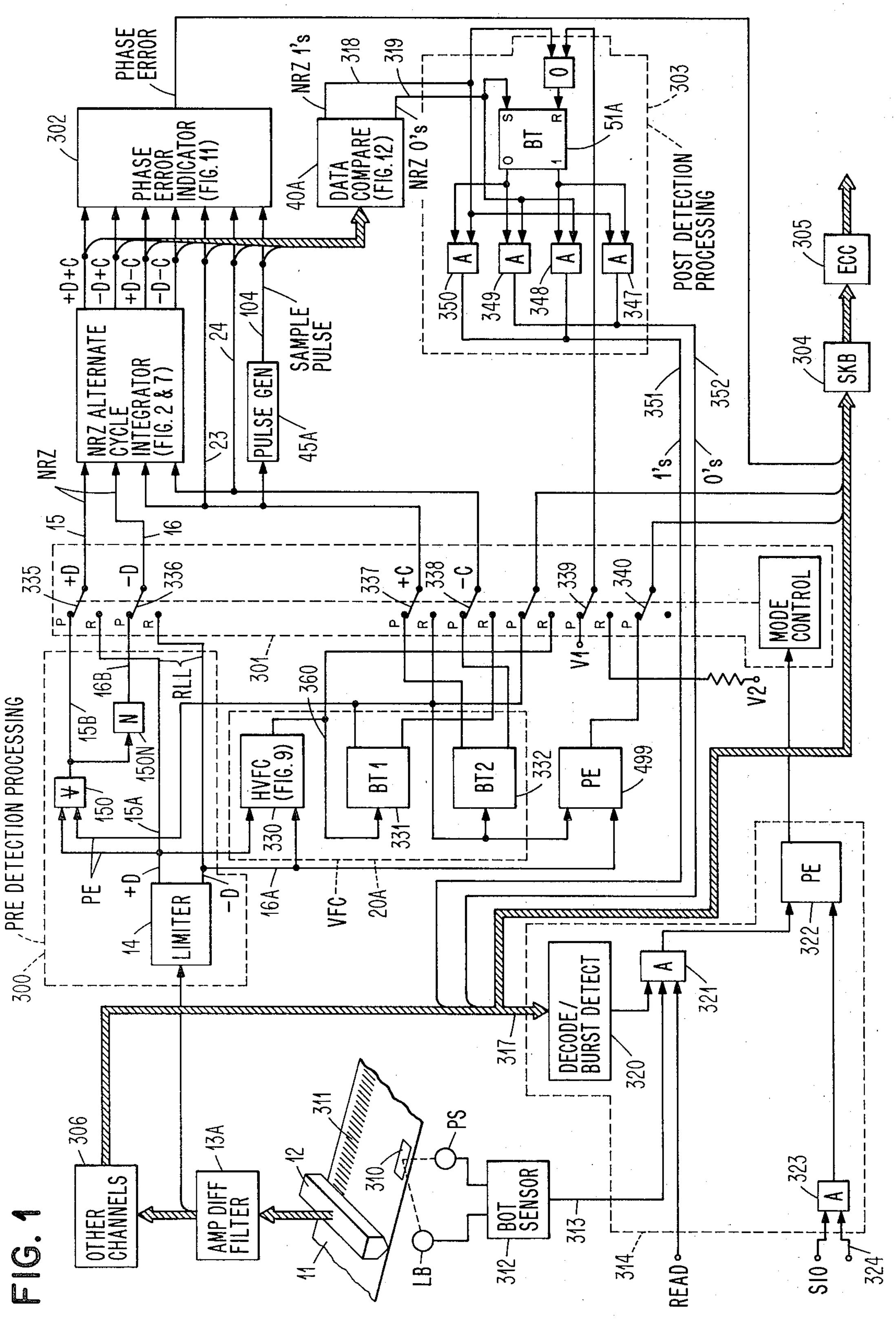
FIG. 1 is a simplified diagram of a preferred embodiment of the invention.
Figures 2, 5:
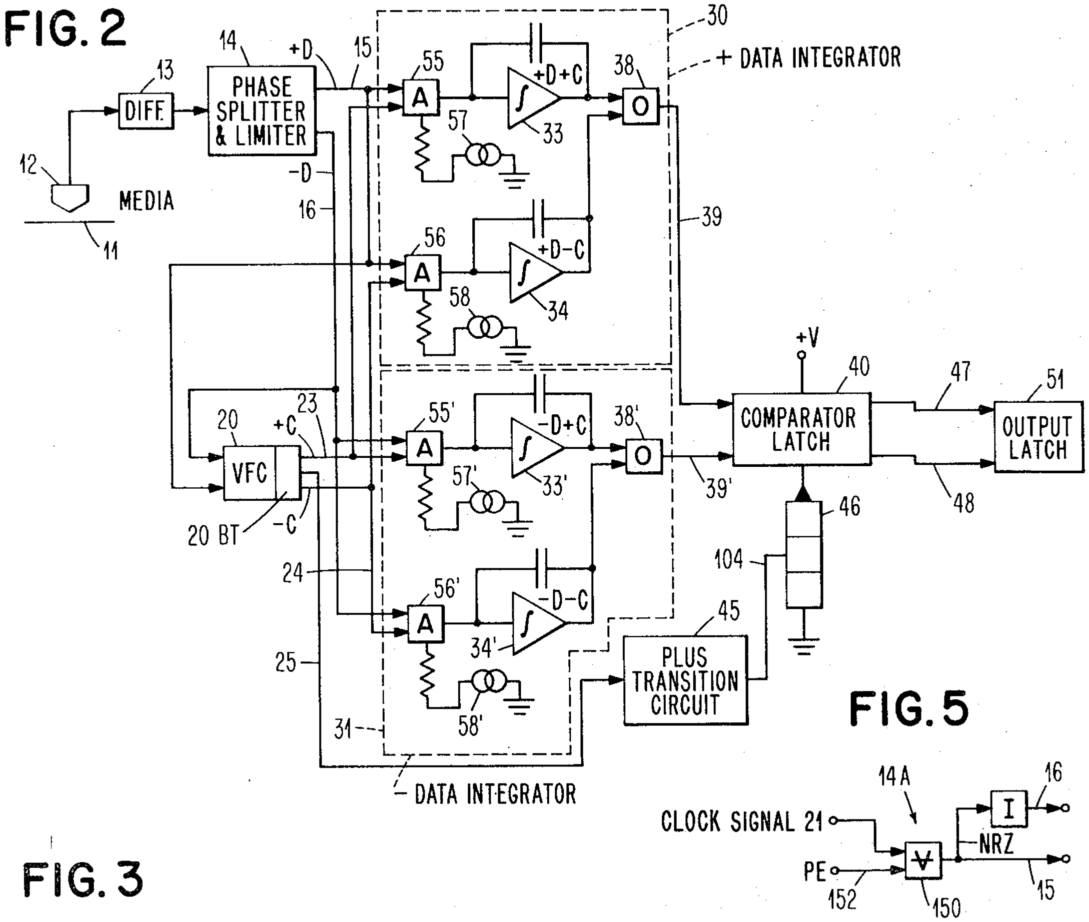
FIG. 2 is a simplified signal flow diagram showing one embodiment of an integrator detector.
FIGS. 5 and 6 illustrate conversion of PE signals to NRZ and DFE signals to NRZI.
Figures 7, 8:
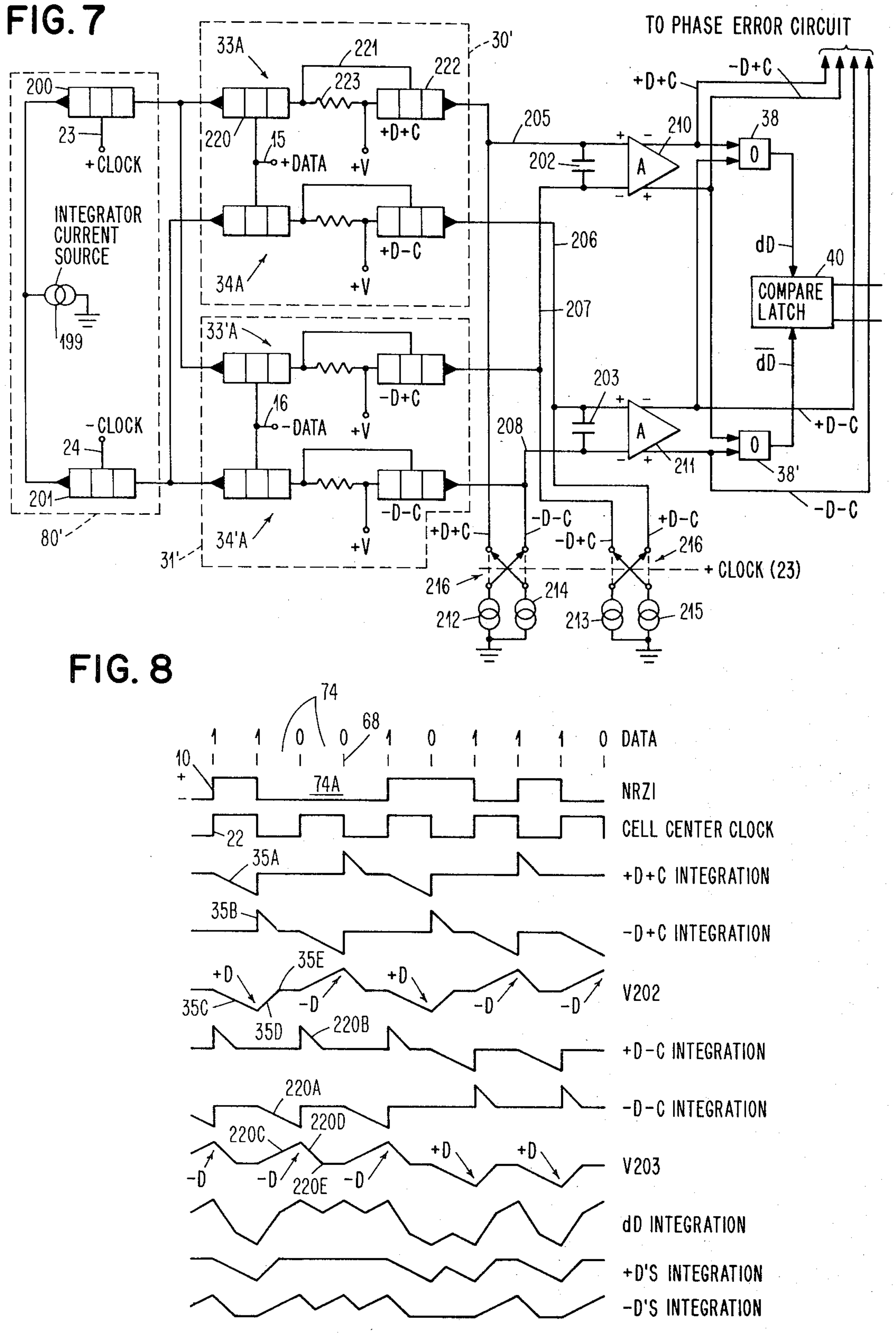
FIG. 7 is a simplified diagram of another embodiment of the FIG. 2 illustrated detector.
FIG. 8 shows a set of idealized signals illustrating operation of the FIG. 7 apparatus.

Referring now more particularly to the drawing, like numerals indicate like parts and structural features in the various figures. The general arrangement of a readback system employing the present invention is shown in simplified diagrammatic form in FIG. 1. Signals recorded on media or tape 11 are sensed by multitrack head 12, then amplified, differentiated, and filtered. Such signals go to limiter 14 within predetection processing circuits 300, as well as to other channels 306, each constructed as a self-clocking channel in the same manner as shown for the individual channel detailed in FIG. 1. Limiter 14 takes the received signals, which are often referred to as analog signals, and converts same into complementary or phase-split amplitude-limited ("digital") signals termed "+D" and "−D" supplied respectively over lines 15A and 16A. It is well known that signals recorded on media 11 may be of several forms, that is, phase-encoded (PE), MFM, NRZI, run-length limited NRZI, and the like. The limited signals +D and −D represent data in those formats. Because of known interchangeability requirements, the readback system is responsive to any one signal in a selected group of data representing formats. Accordingly, predetection processing circuits 300, as well as format select circuits 301, convert and switch the signals from the record storage signal format to a detection signal format, in this instance, an NRZ data-representing format. In this manner, NRZ alternate cycle integrators 30, 31, as shown in FIGS. 2 and 7, are employed to detect data from any one of a plurality of possible signal formats.

NRZ alternate cycle integrators 30, 31 supply detected signals in the form of +D+C, +D−C, −D+C, and —D—C signals, as will be later more fully described, to data compare circuit 40A and to phase error indicator 302. The signal amplitude relationships between the output signals of NRZ alternate cycle integrators 30, 31 indicate the phase reltionship between data signals and clock signals from VFC 20A, hence, represent data and phase shift in the data signals. Data compare circuit 40A supplies output signals representing, respectively, detected NRZ binary ones or zeroes to post detection processing circuits 303. Circuits 303 also have a portion or circuit function for each of the possible formats recorded on media 11. These various post detection functions are actuated by format select 301 in accordance with a selected or given format indicated by format means 314. Deskewing buffers 304, constructed in accordance with Floros Re. 25,527, receive the detected signals and supply deskewed signals to error correction circuit (ECC) 305. ECC circuit 305 detects and corrects errors in accordance with any error detection and correction operation and as used in accordance with the recorded signal on media 11. ECC 305 supplies its output signals to buffers or to a connected CPU (not shown). Phase error indicator 302 interprets the integrated signal amplitudes as phase error indicators.

Detection and indication of which format is recorded on media 11 is accomplished at beginning of tape (BOT), indicated by reflective marker 310. In predetermined geometric relationship to BOT 310 is signal area 311 for receiving signals indicating the record signal format.

In one arrangement, the absence of signals adjacent BOT 310 indicates run-length limited NRZI recording (See Hinz, Jr., U.S. Pat. No. 3,639,900); while a burst of signals recorded in a selected track along media 11 indicates that phase-encoded (PE) signals are recorded on media 11. Format means 314 responds to BOT 310 via BOT sensor 312 and the recorded signals in area 311 as may be detected by other channels 306 and NRZ integrating detector 30, 31 to actuate format select circuits 301, as will become apparent. It is to be understood that the format indication may be by reflective means, coded patterns in area 311, and may indicate one of many possible formats. Also, separate signal burst detectors may be employed for detecting presence or absence of format identifying signals.

Along these same lines, predetection processing circuits 300 may include a large plurality of portions or circuit functions, one for each of the possible formats, for converting same to the selected intermediate NRZ signal format usable by the NRZ alternate cycle integrators 30, 31. Further, format select circuits 301 may include a like plurality of signal selection functions for selectively connecting the respective signals from circuits 300 to the integrating detectors 30, 31. In the same manner, post detection processing circuits 303 and the detector output control portions of format select circuit 301, as symbolically represented by switches 339 and 340, have a like plurality of signal controlling functions in accordance with the maximum number of possible formats detectable by the particular apparatus employing the present invention. Similarly, format means 314 have a plurality of decoders and indicators for each of the respective possible signal formats for controlling format select circuits 301, and may be a programmed machine, such as shown by Irwin in U.S. Pat. No. 3,654,617. In some instances, portions of circuits described above may be shared between different formats. That is, predetection and post detection processing, such as for PR and DFE, could share later-described circuit portion 14B. Similarly, DFE detected outputs from integrator detectors 30, 31 are processed with NRZI detected signals. Further, VFC 20A has a capability of adjusting its frequency of operation in accordance with all of the possible formats, as also will become apparent.

Returning now to sensing and indicating a record format, BOT sensor 312 includes a light bulb LB supplying a light beam (dotted line) toward tape 11 such that BOT area 310 reflects same toward photosensor PS. The photosensor supplies an electrical signal in accordance with the reflected light to a threshold detector (not shown) within BOT sensor 312. When the threshold is exceeded, i.e., a reflective area is being encountered, an activating signal is supplied over line 313 to format means 314. This signal signifies that the tape is positioned at BOT area such that transducer 12 will be sensing format identification signals on media 11. This actual physical relationship is not shown in FIG. 1 for brevity.

Format means 314 also receives a read command signal received from a control portion of a digital recorder, such as shown in Irwin U.S. Pat. No. 3,654,617. Irwin teaches that in response to control signals from a connected CPU (not shown), write (recording) or readback operations are performed by an I/O control unit or controller. The control portion, which may include microprocessors, generates status or command signals, such as read or write for use by the signal processing circuits, such as those disclosed in the present application. In this instance, the read signal from such a control apparatus is combined with the BOT signal on line 313 within AND 321 to gate the output signals of format decode 320 to set PE latch 322 to signify that PE signals are being read back. Decode 320 can be any type of decoder responsive to signals read from the tape as supplied by the other channels 306 and over lines 318 and 319 from post detection processing circuits 303, as will become apparent. The coded format of the signals in area 311 signify the format of the data signals recorded on tape 11. In the particular instance, PE latch 322 being reset signifies that run-length limited signals, as will be discussed, are recorded on media 11. Accordingly, when a readback operation is first initiated, latch 322 is reset. AND 323 is jointly responsive to a start I/O (SIO) signal supplied by the control portion, such as in Irwin, supra, and a "not ready to ready interrupt" signal received over line 324 signifying that a new reel of tape has been mounted on a tape drive (not shown) to reset PE latch 322. If decode 320 does not detect PE indicating signals, then PE latch 322 remains reset allowing format select circuits 301 to pass signals as in the RLL (run-length limited) format (NRZI signals). If, however, PE latch 322 is set, circuit 314 supplies an activating signal to format select circuits 301 for passing all signals as PE readback signals. Format select circuits 301, in that case, select the PE representing signals from predetection processing circuits 300 after conversion to the NRZ detection signal format. Similarly, switch 339 simultaneously actuates that portion of post detection processing circuits 303 corresponding to PE format for passing the detected ones and zeroes signals from data compare 40A to deskewing buffers (SKB) 304. In a similar manner, format select circuits 301 select the timing signals from VFC 20A in accordance with PE format, which signals have a different frequency of operation than those used to detect RLL data format signals, as will become apparent.

Returning now to predetection processing circuits 300, tape 11 by arbitrary definition has two possible formats, PE and RLL (an encoded form of NRZI). Predetection processing circuits 300 have two portions for the respective possible formats. The first portions consists of lines 15A and 16A being connected to the run-length limited (R) terminals of format selection switches 335 and 336. The RLL format signals being NRZI need no input conversion, hence, are directly connected through format select circuits to the NRZ alternate cycle integrator detectors 30, 31. The PE signals, however, need to be partially synchronously demodulated (phase detects) by circuits 300. EXCLUSIVE-OR circuit 150, one for each and every channel of recording, receives the respective +D signals from line 15A to be frequency mixed with clock signals from binary trigger 331 within VFC (variable frequency clock) 20A. As fully described in the preceding application, of which this is a continuation-in-part, mixing the PE data signals with such clock signals in an EXCLUSIVE-OR converts same to NRZ signals. Inverter 150N inverts the resultant +D NRZ signals to later-described −D NRZ signals on line 16B. Lines 15B and 16B transfer the NRZ complementary data signal to the respective P terminals of switches 335 and 336 in format select 301. Binary trigger 331 drives binary trigger 332 to generate the later-described +clock and −clock signals for timing the operation of NRZ alternate cycle integrators 30, 31. For RLL data signals, the output signals of binary trigger 331 time the integrators 30, 31 via the R terminals, respectively, in switches 337 and 338. Since RLL data signals are NRZI, those signals are directly inputted to integrator detector 30, 31 with post detection processing accommodating the data representing differences between NRZ and NRZI formats.

THE ALTERNATE CYCLE INTEGRATOR

The alternate cycle integrator detector shown in FIG. 2 is described for detecting RLL–NRZI recording, such as shown by Hinz, Jr., in U.S. Pat. No. 3,639,900. The readback signal from readback head 12 is differentiated at 13, and then supplied to phase splitter and limiter 14. Includes in differentiator 13 may be baseline, peak shft, or other compensation circuits. Phase splitter and limiter 14 generates limited signal (+D) 10 (FIG. 3) from the readback signal and supplies same over line 15. The complement, i.e., polarity reversed, signal (−D) is simultaneously supplied over line 16. In both signals, a change in distinct state within a data bit period from plus to minus or vice versa indicates a binary one, while no change in state within the data bit period indicates a binary zero. By definition, the change in states or absence of such change in states occurs at record cell centers on media 11.

Signal 10 on line 15, as well as the complement signal on line 16 is supplied to VFC (variable frequency clock) 20 for generating clock signals 21 and 22. The RLL clock signal 21 has a period equal to the data bit period. As media 11 passes readback head 12, VFC 20 tracks the frequency variations, such as those caused by media velocity variations. Cell center clock signal 22 is derived from signal 21 and is supplied in complement form over lines 23 and 24. The signal on line 23 is signal 22 and is referred hereinafter as a plus clock or a +C signal. The complement, i.e., polarity reversed, cell center clock signal appears on line 24 and is hereinafter referred to as the minus clock signal or −C signal. Signal 21 is supplied over line 25 for generating a sample pulse to gate data signals from comparator latch 40, as will become apparent. In RLL detection, signal 21 comes from HVFC 330, while signal 22 comes from BT1 331. Additionally, binary trigger or triggered flip-flop 20BT responds to all transitions of signal 22 to frequency divide signal 22 by two, thereby supplying +clock and −clock signals, respectively, on lines 23 and 24.

The complementary clock and data signals are integrated and combined in data integrators 30 and 31. The relative output amplitudes of these two integrators indicate the polarity of signal 10 during the immediately preceding sample period. The sample period extends from cell center to cell center, no limitation thereto intended. Integrator 30 integrates the positive portions of signal 10 (+D signal). Integrator 31 effectively integrates the negative portions of signal 10 by integrating the positive portions of the complementary signal on line 16 (−D signal).

Since both integrators are constructed identically, plus-data integrator 30 is described with the same numerals primed being used in minus-data integrator 31. Each integrator has a pair of integration circuits respectively labeled +D+C, +D−C, −D+C, and −D−C. The labels indicate when the respective integration circuits are actuated to integrate linearly with time. +D+C integration circuit 33 integrates +D data signals 10 with +C clock signals 22. +D−C integration circuit 34 similarly integrates +D with −C signals. −D+C and −D−C circuits 33' and 34' operate with the −D data signal in the same way the two integration circuits in each integrator are successively and alternately actuated by the clock signals to integrate signal 10 during one of its distinct signal states. In this manner, the entire data bit period is usable for detection. No portion of the data bit period used in detection integration need be used for squelch. Using a substantial portion of the next succeeding detection period permits a slow squelch or integration recovery. This action reduces the frequency requirements on the squelch circuit, reduces noise and increases the phase shift handling capability of the detector.

Signal 35 is the output of integration circuit 33. It has a positive-going voltage ramp each time signals 10 and 22 are both positive (+D+C). Similarly, signal 36 is the output of integration circuit 34 and has a positive voltage ramp for +D−C. Signals 35' and 36' relate to circuits 33' and 34' in the same manner for −D+C and −D−C signal combinations. The outputs of circuits 33 and 34 are analog-OR'd in circuit 38 with the analog-OR result signal supplied over line 39 to later-described comparator latch 40. An analog-OR circuit passes the larger amplitude signal of all input signals of a given polarity (positive in the illustrated circuit). Line 39 carries signal 41 while line 39' carries signal 41'. Signal 41 has a positive amplitude equal to the more positive amplitude signal 35 or 36.

Integration circuit 33 recovers (squelches) to its references state during negative portions of cell center clock signal 22 while circuit 34 recovers to its reference signal state during positive portions of cell center clock 22. Also, note that the recovery time requires a substantial portion of each next successively occurring sample period, for example, 75 percent of a sample period. Such sample period preferably equals the duration of a bit period on media 11. The reference signal state may be clamped as suggested by Korn and Korn in "Electronic Analog Computers," Pages 411 and 412, 1956, McGraw-Hill, Library of Congress Number 56–8176.

Sample time, i.e., detection of data, occurs immediately following each sample period, i.e., at each cell center. Sample time is defined by the positive-going transitions in clock signal 21. Plus-transition circuit 45 responds to such positive-going transitions to actuate gate transistor 46 to current conduction for a short period of time. This turns the comparator latch 40 on which effects detection as will later be described. At all other times, gate transistor 46 is current nonconductive disabling comparator latch 40. This selective actuation of comparator latch 40 produces signal 125 on line 47 and its complement signal on line 48.

Selective actuation of integrator circuits 33 and 34, as well as the signal recovery (squelch) during successive alternate detection periods, is now described. A pair of special AND circuits 55 and 56 are respectively jointly responsive to the line 15 and line 23 signals and to the line 15 and line 24 signals to supply constant amplitude signals to integrator circuits 33 and 34. Such special AND circuits are later described with respect to FIG. 4. These constant amplitude signals enable integration circuits 33 and 34 to integrate at a linear rate to effect reliable indication of the duration of each distinct signal state of signal 10 in each sample period. When the cell center clock signals on lines 23 and 24 are respectively in their negative signal states, AND circuits 55 and 56, as will be later described, electrically connect constant current sources 57 and 58 respectively to the input portion of integration circuits 33 and 34. These current sources cause the integrator circuits to recover toward a reference potential at the given rate illustrated in the FIG. 3 idealized waveforms. On reaching the reference potential, the constant current sources are no longer effective. When cell center clock signals are positive and the data signal on line 15 is negative, there is no input signal supplied to integration circuit 33. Rather, a high impedance is presented thereto such that it holds its presently integrated voltage amplitude. This is shown in the FIG. 3 signals at 64, 65, and 71.

The ability to hold a given integrated signal during a sample period is useful in obviating peak shift and baseline recovery errors in signal 10. Dotted lines 60 and 61 in signal 10 illustrate noise and baseline recovery. Referring now to signal 35, when signal 10 goes positive, i.e., recovers its baseline as at 61, integration occurs in circuit 33. This is shown by sloped line 62. However, when signal 10 returns to its negative value at 63, the integrated amplitude in circuit 33 is held as indicated by flat portion 64. Integrator circuit 33′ is similarly affected. As soon as signal 10 goes positive at 61, circuit 33′ no longer integrates but holds its integrated value as at 65. Upon signal 10 returning to its negative states at 63, integrator circuit 33′ continues to integrate as shown at 67.

At the next occurring cell center 68, the amplitudes of signals 41 and 41′ are compared. Since signal 41′ has the greater amplitude at 70 than signal 41 has at 71, minus data (−D) is indicated. This results in no change in the signal state indicating that a binary zero has been recorded at cell center 68. Please note that the amplitude difference between signals 41′ and 41, because of the baseline recovery error 61, decreases. A similar problem occurs when the NRZI signal 10 is peak shifted. That is, the transition, such as transition 72, does not occur at the cell center; rather, it is shifted as indicated by dotted line 73. The present detection scheme distinguishes and overcomes such peak shift up to, but not including, the cell boundaries as at 74. This corresponds to a 50 percent peak shift which is not expected in most recording schemes. A typical severe peak shift is 25 percent as shown by dotted line 73. Phase error may be indicated when the output amplitudes of analog-OR's 38 and 38′ are approaching the same amplitude at sample time.

DESCRIPTION OF THE ORIGINALLY PREFERRED DETECTOR

Figures 4, 6:
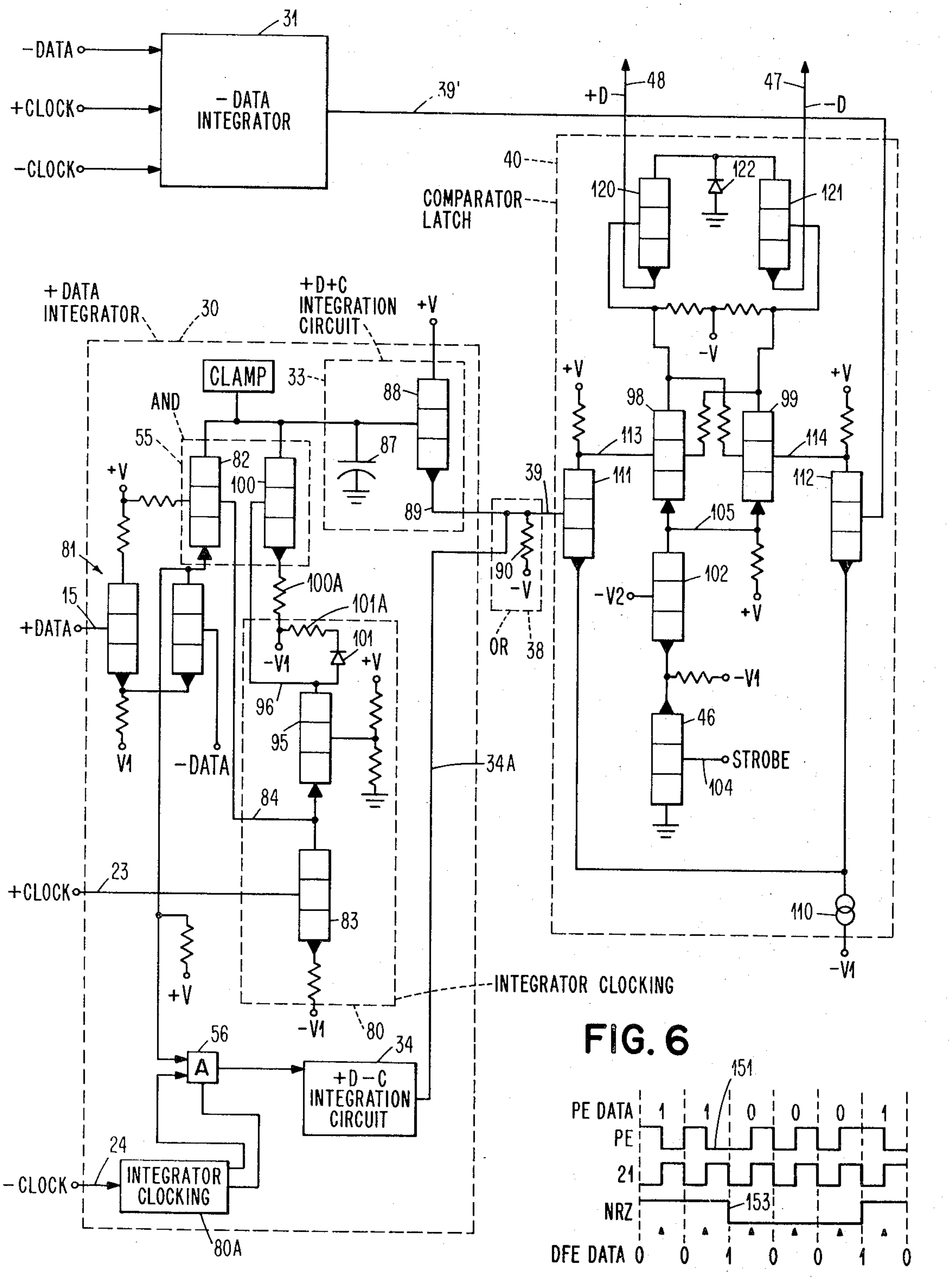
FIG. 4 is a combined block-schematic diagram of data integrators usable in the FIG. 2 illustrated system.

To attain such signal error insensitivity, a relatively sensitive amplitude comparator is provided as well as linear and identical integrators. FIG. 4 shows in schematic form a preferred linear data integrator with a preferred sensitive comparator latch. Again, +D integrator 30 is described in detail, it being understood that −D integrator 31 is constructed in a like manner.

+D integrator 30, special AND circuit 55, together with integrator clocking (not shown in FIG. 2) 80 and details of +D+C integration circuit 33, are described. Integration circuit 34, special AND circuit 56, and integrator clock circuit 80A are shown in block form. Data signals 10 on line 15 are supplied through amplifier or inverter circuit 81 to AND circuit 55 as an emitter input to transistor 82. Integrator clocking circuit 80 and +data being positive switches transistor 82 to the current conductive state to pass a constant current to circuit 33. Circuit 80 receives +C signal on line 23 as a base input to gate transistor 83. Whenever the signal on line 23 is positive, transistor 83 is current conductive causing the voltage potential on line 84 to be relatively negative. This relatively negative potential causes transistor 82 to be current conductive. The cnstant-current output signal from transistor 82 linearly charges integrating capacitor 87 when +data on line 15 is positive when +clock is positive In circuit 33, transistor 88 has its base electrode connected to capacitor 87 for supplying a continuous output through its emitter to line 89. Analog-OR circuit 38 receives signals from lines 89 and 34A of +D−C integration circuit 34. Analog-OR circuit 38 passes the more positive signal from lines 89 and 34A to comparator latch 40. Analog-OR 38 resistor 90 connected to −V potential such that a more positive signal from either of the integrator circuits 33 or 34 determines positive amplitude on line 39. The more positive output degates the other integrator output.

Integrator clocking circuit 80 also squelches integration circuit 33 during each next succeeding detection period. That is, when +C signal on line 23 goes negative, transistor 83 becomes current nonconductive. This action makes line 84 relatively positive for biasing transistor 95 to current conduction. A fixed bias potential is supplied to the base electrode of transistor 95, making it a current source. The collector of transistor 95 is connected via line 96 to squelch transistor 100 in AND 55. Capacitor 87 discharges a constant rate through transistor 100 to a clamp voltage. The discharge or squelch rate is determined by the resistance ratio of the emitter resistor 100A to diode 101 series resistor 101A and the constant current amplitude supplied by transistor 95.

The analog-OR sum signal on line 39 is supplied on one input of comparator latch 40. In a similar manner, the analog-OR sum signal from −D integrator 31 is supplied over line 39' to the opposite input. The comparator latch is similar to the one published by Gene Clapper in the IBM TECHNICAL DISCLOSURE BULLETIN, February 1964, on Page 69. The present comparator latch provides certain improvements in repeatability and enhanced sensitivity.

The cross-coupling portion of latch 40 includes two active element transistors 98 and 99. The emitter electrodes of these two transistors are connected together at 105 and to the collector of transistor 102. The emitter of transistor 102 is connected to −V1 via a suitable resistor. Gate transistor 46 is in the grounded-collector configuration and emitter drives common-base connected transistor 102. Transistor 46 normally is held to a current nonconductive state by a relatively negative signal on line 104. This action makes 105 negative via transistor 102 current conduction to reverse bias PNP transistors 98, 99 to current nonconduction (latch is off). For sampling, circuit 45 (FIG. 2) supplies an actuating (sampling) pulse over line 104 turning transistor 46 on for activating comparator latch 40 by making transistor 102 nonconductive.

When not sampling, the emitter electrode of grounded-base transistor 102 is at a relatively negative potential making it current conductive. This action causes common emitter connection 105 to be at a relatively negative potential making both transistors 98 and 99 current nonconductive (latch is inactive). The active elements of latch 40 are in a reversed-bias condition to make latch 40 nonresponsive to input signals. At sample time, i.e., immediately after each cell center or detection period, the signal on line 104 is changed making transistor 46 current conductive. This action makes transistor 102 current nonconductive. Connection 105 becomes positive such that transistors 98 and 99 immediately respond to the analog voltages on lines 39 and 39' to assume a stable state in accordance with the more positive input amplitude. After assuming this stable state, latch 98, 99 is nonresponsive to small changes on lines 39 and 39' to hold or store the detected signals for the duration of the sample pulse.

A particular input gating circuit to the latch enhances sensitivity of the comparison function. constant-current source 110 is connected to the emitters of latch-input transistors 111 and 112. Signal amplitude differences on line 39 and 39', respectively, are amplified through these two transistors to the base electrodes of transistors 98 and 99. Constant-current source 110 being connected commonly to the emitters of latch-input matched transistors 111 and 112, enables a precise current division therebetween. Then the voltage amplitudes on the two lines 39 and 39' are precisely compared. Accordingly, the transferred signals to input lines 113 and 114 are in accordance with the integrator output signal amplitudes. Any drift in constant-current amplitude of source 110 is equally reflected on both sides of the input. By selecting the transistors 111 and 112 for temperature characteristics, any drift in temperature will be compensated since the two transistors are differentially connected. Once the circuit is latched, the inputs on lines 39 and 39' cannot alter the latched state until the next sample pulse occurs.

The output circuitry of comparator latch 40 includes matched transistors 120 and 121 having a common collector connection to supply diode 122. The collectors of the latch transistors 98 and 99 are respectively connected to the base electrodes of transistors 120 and 121. During sample time, if the +D input on line 39 is greater in amplitude than the −D signal on line 39', only transistor 98 becomes current conductive. A relative positive voltage appears at the base electrode of transistor 120. Correspondingly, a relative negative voltage continues at the base electrode of transistor 121. In a similar manner, if the amplitude on line 39' is more positive than the amplitude on line 39, a reverse operation is effected; i.e, transistor 99 becomes current conductive while transistor 98 remains current nonconductive. The resultant differential signal 125 between lines 47 and 48 results from the just-described action. The pulse portions of signal 125 correspond to strobe pulses on line 104, positive pulses with respect to ground reference potential appearing on either line 47 or 48 after each and every detection period in accordance with the integrator output signal amplitudes.

Figure 3:
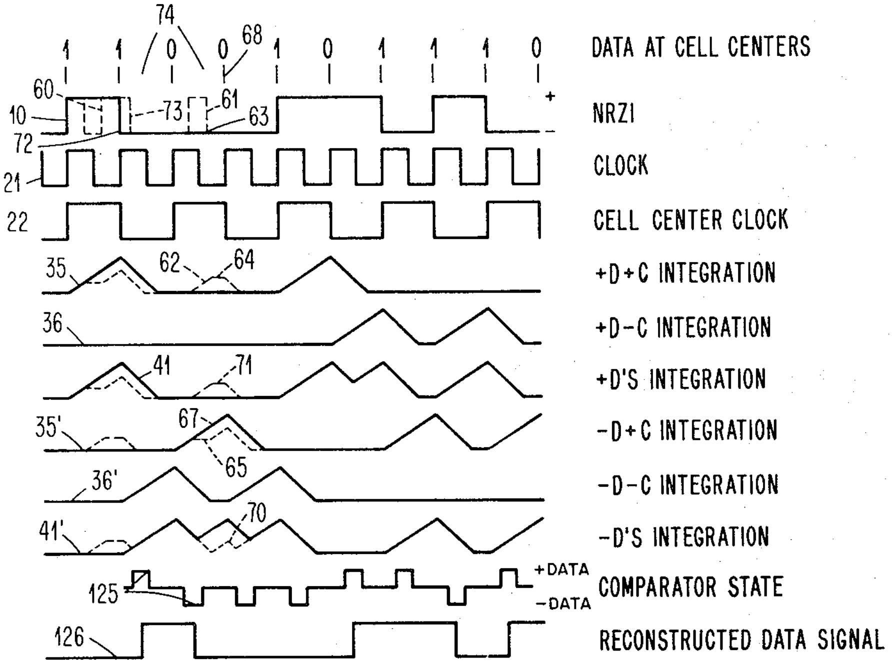
FIG. 3 is a set of idealized signal waveforms used to describe the FIG. 1 illustrated detector.

Referring now to FIG. 3, it is seen that an active comparator state occurs only for a portion of each detection period. The gated signal state of comparator latch 40 sets and resets output latch 51 in accordance with the comparator latch signal state, thereby reconstructing the input data waveform 10, as data signal 126, the usual conversion circuits for reconverting waveform 126 to other data-representing signals is well known and not discussed here for that reason. It should also be remembered that input signal 10 is shown in idealized form. In the practical system, the binary 1 indicating transition could appear at the exact cell centers only in a string of ones, with peak shift causing the transitions to appear between the idealized cell centers.

The FIG. 2 illustrated detector is adapted at its input for PE or DFE (double frequency encoding or frequency modulation) by adding an Exclusive-OR function to circuit 14. As shown in FIG. 5, Exclusive-OR circuit 150 receives PE input signal 151 over line 152. This signal has been differentiated and limited in a known manner. Signal 21 from VFC 20 (FIG. 2) or from BT1 of FIG. 1 is supplied to the other input. From inspection of the signals shown in FIG. 5, the Exclusive-OR of signals 151 and 21 produce intermediate NRZ signal 153. The FIG. 2 circuit then detects NRZ data signal 152 as supplied over line 15 and the complement (−D) signal supplied over line 16.

If the signal 151 is DFE, i.e., cell boundaries are indicated by the carets which correspond to cell centers of PE, then the Exclusive-OR output signal is NRZI. Detection of NRZI follows the same procedure as for NRZ, except the interpretation of reconstructed signal 126 is changed by post detection processing, as later described.

The present invention is also applicable to detection of RZ (Return to Zero), FSK, and other data-representing signals. Modifications, such as described for PE and DFE, may be necessary to detect various types of signals without detracting from the fundamental concepts of this invention.

DESCRIPTION OF LATER PREFERRED CIRCUITS

Referring to FIGS. 7 and 8, a simplification and improvement of the circuits illustrated in FIGS. 2 and 4 is shown. Salient differences between FIG. 7 and the originally preferred detector circuits are time sharing of the integrating capacitors, time sharing of current sources, simplification and using only NPN-type semiconductive devices. The FIG. 7 illustrated apparatus is more easily incorporated into a semiconductor integrated circuit chip than the originally preferred circuits. The broad inventive concepts set forth in FIGS. 1–3 still appertain to the FIG. 7 arrangement as will become apparent from the following description. Additionally, integrator clocking for effecting synchronous demodulation is greatly simplified and more reliable. Differential techniques enhance circuit operation.

Single clocking circuit 80' provides a clocking signal for both modified integrators 30' and 31' corresponding favorably to the plus and minus data integrators of FIG. 2. The integrated signals for both integrators are stored in capacitors 202 and 203 on a time-shared basis. Capacitor 202 is differentially connected between line 205 of +D+C integration circuit and line 207 of −D+C integration circuit. In a similar manner, storage capacitor 203 is differentially connected between line 206 of +D−C integration circuit and line 208 of −D−C integration circuit. Notice that the differential connection is between integration circuits actuated by the same clock phase but of opposite polarity data signals. The general mode of operation is that during one cycle or first bit period, the +D+C integration circuit integrates its signal via line 205 into capacitor 202, while line 207 acts as a reference potential. During the next successive +clock integrating or sample period, line 205 becomes a reference; and line 207 receives the integrating signal on the −D+C integration circuit. Because of the time sharing involved with the current sources, as will become apparent, the actual electrical current that is integrated in the capacitors 202, 203 does not actually flow through circuits 30' and 31'. Those circuits control, as an electronic switch, the integrations performed in capacitors 202 and 203 on a time-shared basis.

The output signals of the integration circuits are supplied through high-input impedance differential amplifiers 210 and 211 respectively to the analog-OR circuits 38 and 38' which may be electrical connections or "dot OR's" of the output portions of amplifiers 210 and 211. Analog-OR's are in turn, connected to compare latch 40 as shown in FIGS. 2 and 4. The signal input to latch 40 is dD integration signal from OR 38 and the inversion of same from OR 38' (a differential or double-ended signal).

The actual integrating currents and squelch currents for integrators 30' and 31' are respectively supplied by current sources 212, 213 and 214, 215 in successive sample periods by reversing switches 216. During a first one of the successive periods, as shown by the switch 216 solid lines, the integrating currents are supplied by current sources 214 and 215, respectively, to lines 205 and 207; while squelch currents are simultaneously supplied by sources 212 and 213 to lines 208 and 206. During the second or successive one sample period, represented by the dotted line connections in switches 216, the reversing switches 216 reverse the connections such that integrating current sources 214 and 215, respectively, supply integrating currents to lines 208 and 206; while sources 214 and 215 supply squelch currents, respectively, to lines 205 and 207.

The arrangement provides a synchronous demodulator in that +C (plus clock signal) on line 23 not only actuates reversing switches 216 for supplying the integrating currents, but also times the operation of the integration circuits via circuit 80' by alternately actuating transistors 200 and 201 to divert current from source 199, respectively, to two different sets of the same clock-phase integration circuits. Clock transistor 200 is responsive to the +C on line 23 to become current conductive whenever +C is positive. Current flow is then from source 199 through the clock transistor 200, thence to integration circuits 33A and 33'A. In circuit 33A, switching transistor 220 is responsive to a +D (+ data signal) on line 15 to become current conductive. When current conductive, a relatively negative voltage is supplied at its collector via drop across collector resistor 223. Then, a negative voltage on line 221 causes integration control transistor 222 to become current nonconductive. When it is current nonconductive, current supplied to line 205 from source 214 via reversing switch 216 flows into integration storage capacitor 202. If +D is negative on line 15, then integration controlling transistor 222 is current conductive diverting all of the current from source 214 to its collector supply. All of the other integration circuits 34A, 33'A, and 34'A operate in an identical manner with respect to the clock circuits 80', the data signals, and the current sources 212–215 as can be determined by examining FIG. 7.

For establishing a more clear understanding of the interrelationship of the integration circuits, the integration storage capacitors 202, 203, and the current sources for supplying synchronously demodulated signals through analog-OR's 38 and 38' to latch 40, reference is made to FIG. 8 wherein like numbers indicate identical signals and timings as shown in FIG. 3 and as previously described with respect to FIG. 2 and FIG. 4. Signals 125 and 126 of FIG. 3 are omitted in that they are identical for both embodiments.

The same data pattern is used in both FIGS. 3 and 8 for more clearly showing the functional identicalness of the two embodiments. NRZI data signal 10 is received from media 11 (FIG. 2), phase split in circuit 14, and supplied as +D and −D signals on lines 15 and 16, respectively. FIG. 7 picks up the complementary data signals on the +D and −D terminals in the same manner as the integration circuits in FIG. 2. Cell center clock signal 22 repeated in FIG. 8 shows the timing relationships. Clock signal 21 is also used for operating compare latch via gating transistor 46 as previously described. The +D+C integration signal in FIG. 8 is somewhat different from the +D+C integration signal of FIG. 2 because of the differential connection of the integration storage means. During a first timing period, +D+C integration signal at 35A transfers current from current source 214 to capacitor 202. At the end of the period, the cell center clock reverses, causing transistor 200 to be nonconductive and clocking transistor 201 to be current conductive. This substantially simultaneous action makes the transistor 220, and its corresponding part in 33'A, current nonconductive. This action causes line 221, and the corresponding line in 33'A, to become relatively positive causing integration control transistor 222 to become current conductive. When it is current conductive, it establishes a reference potential on line 205. This is a rapid change from the integrated peak value 35A. Because of the substantial instantaneous charge, the voltage across capacitor 202 is maintained resulting in a rapid voltage change in the −D+C integration circuit at 35B. This voltage is then dissipated from capacitor 202 by constant current from source 213 at a rate twice the integration rate of the integrating current sources. The voltage across capacitor 202 is shown as V202 in FIG. 8. Notice that the netative-going excursion 35C corresponds to a +D integration between the first two successive ones in the data pattern.

Capacitor 202 is discharged to a reference potential at time 35E in accordance with the slope 35D. Slopes after 35B and at 35D are identical. Polarity of the signal across capacitor 202 is measured positive from line 205 to line 207. During the next successive period at 74A, the −C integration circuits are activated. Accordingly, transistors in integration circuits 34A and 34'A are current conductive allowing the D signals on lines 15 and 16 to control the conductivity of the respective integration control transistors. When those control transistors are nonconductive, integration currents flow into the storage capacitors representing the relative data polarity at −C time. This is shown in FIG. 8 as integration as 220A on capacitor 203, which is a −D integration. The capacitor discharge in the period at 220C is completed at 220E. The voltage across capacitor 203 is shown as signal 220D with positive polarity being measured from line 206 to line 208.

Interaction of the capacitors, current source integration circuits, and the C signal can be further analyzed by studying the waveforms in FIG. 8. For convenience of the reader, the +D and −D integration excursions of the capacitors and the dD integration signal are respectively labeled as +D and −D which follow the signal excursion of NRZI signal 10. Note that integration occurs alternately with respect to caacitors 202 and 203 as can be seen by examining the signals V202 and V203 and observing the +D and −D symbols.

The transfer of voltage potential from one side of a capacitor 202 or 203 to the other side permits squelching or discharging the capacitor to a reference potential during a next successive cycle without requiring four capacitors. Note that in the event of noise, the capacitor discharge and charge is affected in the same manner as that shown in FIG. 3 with respect to noise signals 60 and 21 and phase shift 73. Such perturbations in the integration and discharge of capacitors 202 and 203 are not shown in FIG. 8.

Analog-OR circuits receive the integrated signals from the same integration circuits as that set forth in FIG. 2 via amplifiers 210 and 211. The signals passed by analog-OR's 38 and 38' are the differential signals on capacitors 202 and 203, labeled as dD integration signals. That signal dD integration is obtained by current summing V202 and V203 for 38 and inverting (differential action) same for 38'.

For convenience in comparing circuit action with FIG. 2, the +D's and −D's integration signals are shown. The signal across V202 of FIG. 8 has the exact same waveforms seen when looking differentially across the +D+C integrating capacitor with respect to the −D+C integrating capacitor of FIG. 2. The same is true of the signal across V203 in FIG. 8, looking differentially across +D−C integrating capacitor and the −D−C integrating capacitor in FIG. 2, which will produce the exact same waveforms seen at V203 of FIG. 8.

These signals were not readily measurable in the constructed embodiment because of carrying the differential signal handling clear through to latch 40. Note that the +D's and −D's integration signals are substantially the same as that shown in FIG. 3, except that the polarity of the +D's integration signal is inverted.

From the above description, it is seen that the integration circuits 33A, 34A, 33'A, and 34'A alternately by current nonconductance and conductance enable a current source to either squelch or integrate a signal in the capacitors 202 and 203. During squelch times, the integration controlling transistor is always current conductive establishing a reference potential on one side of the complementary connections, i.e., lines 205–208 of the capacitors enabling the other side of the capacitor to perform the squelch function via the squelch current sources. The effect of noise on this circuit is substantially the same as that shown for the circuit of FIG. 2 in that the relative charges on capacitors 202 and 203 will be modified in accordance with the received noise.

The FIG. 7 illustrated circuit can be used anyplace as the FIG. 2 illustrated circuit, and vice versa. An interesting aspect of the FIG. 7 illustrated circuit is that it behaves much like a synchronous demodulator in that the clocking circuit 80' alternately actuates complementary integration controlling circuits 33A, 33'A, 34A, and 34'A to alternately, in successive cycles, evaluate the received D signals on lines 15 and 16.

It is apparent that the signals on lines 15 and 16 need not come from the common source such as phase splitter 14 of FIG. 2. Rather, two independently generated signals may be supplied thereto for synchronous demodulation by clock circuit 80'. The source of the +C and −C signals should be the same if the D signals are being supplied to circuits 30' and 31'. On the other hand, lines 15 and 16 may receive clocking signals, i.e., the synchronizing portion of the demodulation may be applied to circuits 30' and 31' rather than to the clocking circuit 80'. Then, the data can be supplied respectively to transistors 200 and 201. The connections in the circuits are changed to accommodate the abovementioned reversed input connections.

It is seen in FIG. 7 that the clocking circuit portions 200 and 201 respectively apply to both integrators 30' and 31' for applying the +C and −C respectively to both circuits. Accordingly, the +D and −D signals are synchronously demodulated in accordance with both phases of the clock as may be effected by noise as shown in FIG. 3.

VARIABLE FREQUENCY CLOCK

Figure 9:
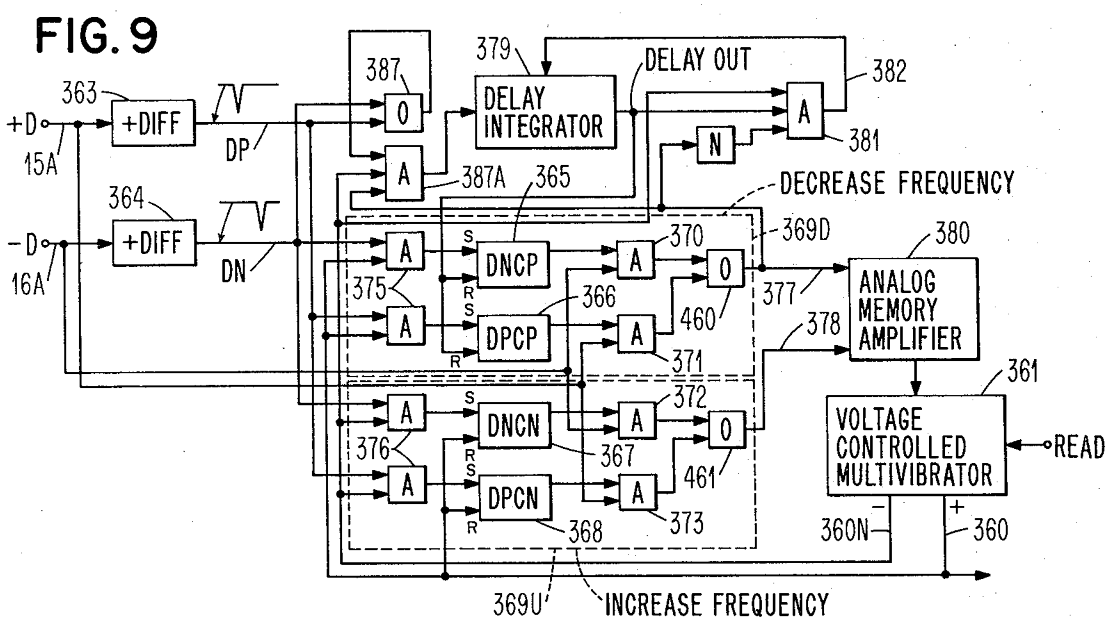
FIG. 9 is a simplified diagram showing a noise-rejecting clock HVFC.
Figure 10:
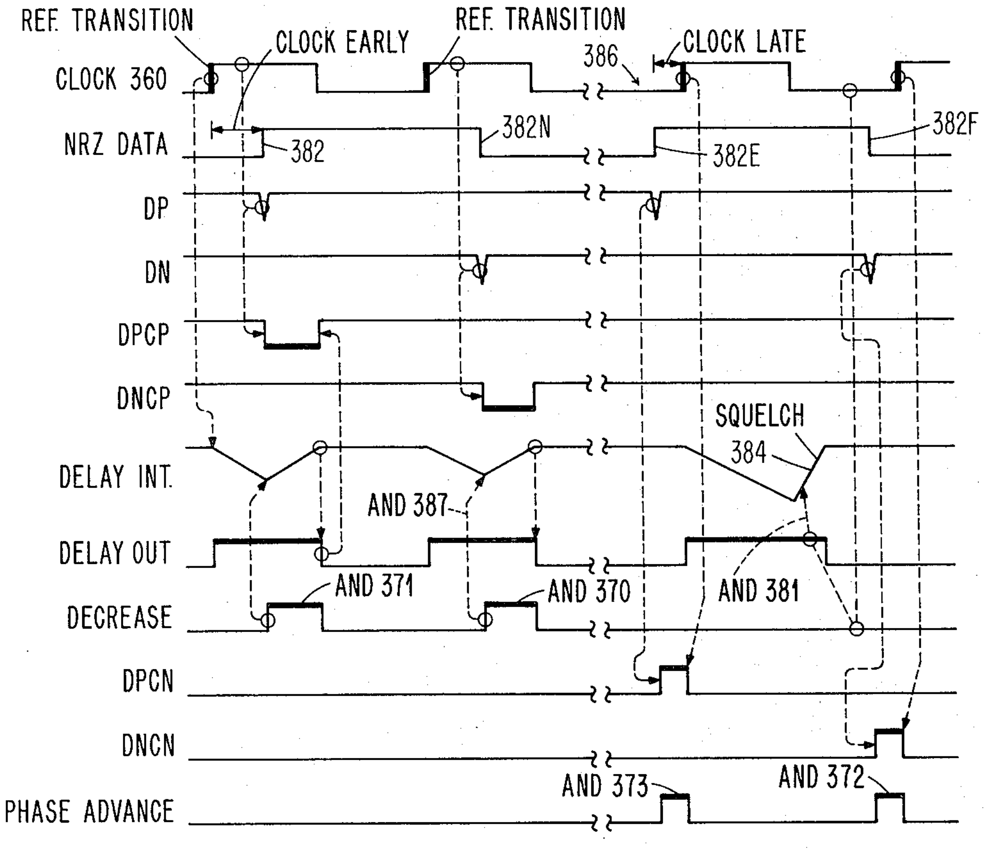
FIG. 10 shows a set of idealized signal waveforms illustrating operation of the FIG. 9 illustrated apparatus.

FIG. 9 is a block diagram of a circuit arrangement to implement HVFC (high-frequency variable-frequency clock) 330, while FIG. 10 shows idealized waveforms illustrating HVFC 330 operation. The high clock signal on line 360, the −D signal on line 16A, and +D signal on line 15A drive HVFC to frequency and phase track the data readback signal supplied to limiter 14. The clock signal is generated by, for example, a voltage-controlled multivibrator (VCM) 361. Each positive transition of the clock pulses are designated as reference transitions shown by the heavy lines in FIG. 10.

Comparison of these reference transitions with data transitions generates correction signals. To enable these comparisons, differentiators (DIFF) or pulsers 363 and 364 supply pulses at positive transitions of the respective +data pulses. DIFF 363 supplies negative pulses DP denoting +data has gone positive, while DIFF 364 supplies negative pulses NP denoting +data has gone negative. Circuit 369U makes comparisons to adjust VCM 361 toward a higher frequency, while circuit 369D makes comparisons to adjust same toward lower frequency operation.

Latch circuits 365, 366, 367, and 368 are conventional bistable circuits. Latches 365 and 366 meter the time between a leading reference transition to the next-occurring data transition for decreasing clock frequency to gain rephasing—see FIG. 10, "clock early." Latches 367 and 368 meter the time from a leading data transition to a following reference transition for increasing clock frequency—see FIG. 10, "clock late." Latch 365 is labeled DNCP (set when data goes negative while clock is positive), latch 366 is DPCP, latch 367 is DNCN, (set when data goes negative while clock is negative, and latch 368 is DPCN.

The AND circuits 370, 371, 372, and 373 are employed for noise rejection by ANDing respectively the +data signal and −data signals with the outputs from the latch circuits, as shown. OR circuits 375 and 376 combine the outputs from AND circuits 370, 371, and 372, 373, respectively, to supply VCM frequency correction signals. These output correction signals on lines 377 and 378, one for a lagging correction and the other for a leading correction, are transmitted to analog memory amplifier 380, of known design. Memory 380 has a low-pass filter network (not shown) with lead compensation to convert the time varying correction pulses to a stored analog voltage indicating phase and frequency to VCM 361. The stored signal amplitude goes through a unity amplifier (not shown) to VCM 361.

Delay integrator 379 meters elapsed times for correction which occur after the reference transition of the clock and comprises, for example, a capacitor (not shown) which begins charging from a constant current source (not shown) at each reference (positive) transition of the clock pulses. The capacitor begins charging in response to AND 387 detecting a correction signal on line 377 of when clock signal on 360N is positive (line 360 clock signal is negative). The active output (Delay Out) from delay integrator 379 is a positive pulse whose duration equals the time used in charging and discharging this capacitor. When Delay Out is reset, it resets latches 365 and 366 signifying the end of the correction signal for decreasing VCM frequency. In addition, AND 381 selectively supplies squelching pulses to discharge this capacitor whenever no correction occurs during the positive half cycle of the clock (after the reference transition). As best seen in FIG. 10, AND 381 is active when clock on line 360N is positive, delay integrator 379 output is inactive, and the signal on line 377 is inactive. When the squelch is complete, the delay out signal from integrator 379 goes negative deactivating AND 381 to stop the squelch.

FIG. 10 illustrates idealized and simplified waveforms generated by the circuits shown in FIG. 9 and is useful to explain the operation of HVFC. The incoming clock signal on line 360 activates delay integrator 379. This pulse causes a constant current source (not shown) to begin charging a capacitor (not shown) according to the delay integrator idealized signal. If the reference transitions occur before the data transition, as at 382, the clock is early—leads in phase with respect to data and needs to be phase retarded. Circuit 369D then slows the clock until phase synchronism is again attained. This action can occur with either a positive or negative-going data transition following the reference transition.

Following such leading reference transition, positive-going transition 382 of the +data signal occurs on line 15 terminal 74 causing +DIFF 363 to supply DP pulse (data positive-going) to AND's 375 and 376. Since after a reference transition, clock is positive, this DP pulse sets DPCP latch 366 (waveform DPCP) and via OR 387 causes the capacitor in delay integrator 379 to discharge at the same constant rate at which it was previously charging. If a clock early adjustment is being made, AND 387A continues the discharge as later described. Delay integrator 379 performs a timing function indicated by the rectangular pulse output "delay out" having a positive signal duration equal to the time the capacitor is charging and discharging. When the output of the capacitor has completely discharged, DPCP latch 366 is reset and no longer produces an active output signifying the end of the correction period. The term DPCP indicates latch 366 is set when data goes positive (DP) and clock is positive (CP). The actual correction signal comes from AND 371 through OR 460, line 377, to memory amplifier 380. AND 371 combines DPCP with +data signal to generate the "decrease" signal of FIG. 10.

The next reference transition is followed by a negative-going data transition as at 382N. The same correction action follows via DNCP latch 365. A reference (positive) transition of +clock signal again causes delay integrator 379 to supply delay out signal. The next data transition is negative (DN) causing −DIFF 364 to supply a DN pulse. This DN pulse sets DNCP latch 365 via an AND 375 generating a DNCP signal and causes the capacitor in delay integrator 379 to discharge as described for DP pulse. When the capacitor is completely discharged, delay out signal from delay integrator 379 changes state to reset latch 365 ending the correction. Since the data signal is now negative, the inputs to AND circuit 370 are satisfied to supply the correction signal to memory amplifier 380. In addition to causing an altered charge in amplifier 380 storage capacitor (not shown) for slightly descreasing VCM 361 frequency to cause a phase lag, such correction signals from AND's 370 and 371 inhibit AND 381, preventing a squelch pulse.

AND 387A maintains return of the delay integrator 379 capacitor (not shown) to squelch reference at the same rate used to charge such capacitor. The discharge meters the phase retard (decrease) signal time, equal to the phase lead time identified as "clock early." The delay integrator stores the phase lead of the clock such that an appropriate phase retard signal can be applied from the first data transition occurring after the reference transition.

Circuit 369U adjusts VCM 361 phase to data synchronism by slightly increasing frequency of operation to generate a phase advance. The next reference transitions phase lag positive data transitions 382E and 382F. Phase correction of VCM 361 does not require use of delay integrator 379, hence, it is squelched. A squelch is applied to the capacitor (not shown) in delay integrator 379, as illustrated at 384. The squelch occurs via AND 381 whenever there is a positive output from delay integrator 379, the line 360 clock signal is negative, and no active correction signal is on line 377. Such conditions define that a phase advance VCM correction is being made, clock is in sync or no data transition occurred. The next data transition at 382E is positive, but occurs in the negative portion 386 of the clock signal. This action actuates one of AND's 376 to set latch DPCN 368. A reference transition of +clock next occurs resetting latch 368. The phase advance correction signal comes from AND 373 responding to DPCN latch 368 and +data signal. AND 373 supplies the phase advance correction signal to analog memory amplifier 380 via OR 461.

The next data transition is negative-going while +clock is negative activating −DIFF 364 to emit a DN pulse to set DNCN latch 367 (waveform DNCN) via one AND 376. The next reference transition of the clock pulse resets latch 367. The active output of latch 367 travels through AND 372 and OR 461 as the phase advance correction signal, as previously described. The −data signal activates AND 372 in conjunction with DNCN latch 367.

Returning now to FIG. 1, HVFC as just described provides a high clock signal over line 360 to RL (run-length) clock generator or binary trigger (BT) 331. Binary trigger 331 divides high clock frequency by two for demodulating the received NRZI data signals in alternate cycle integrators 30, 31, as has been described with respect to cell center clock 22 of FIG. 3. HVFC, however, operates at two times the data frequency for PE recording. Accordingly, the positive output of binary trigger 331, in turn, triggers binary trigger 332 to generate the PE clock signal to NRZ alternate cycle integrator circuits 30, 31 via switches 337 and 338. The BT 331 signal also frequency demodulates the PE signals in Exclusive-OR's 150 and 150N, as previously mentioned. The phasing of HVFC is by the complementary clock signals on lines 360 and 360N, such that the data signals regardless of format and the clock signal are in a phase synchronous relationship.

PHASE ERROR INDICATION

Figure 11:
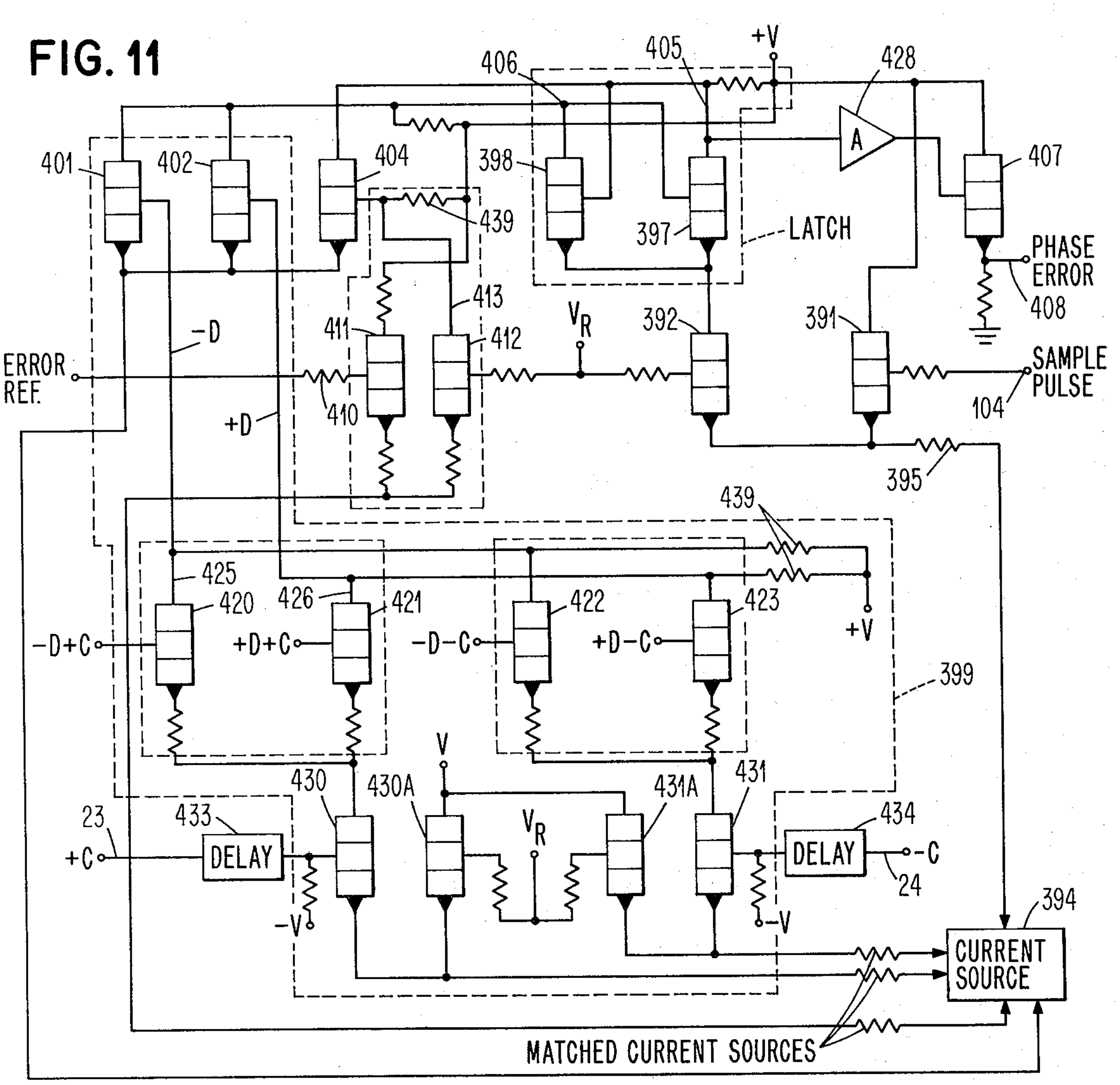
FIG. 11 is a simplified diagram of phase error compare for indicating detected phase errors.
Figure 12:
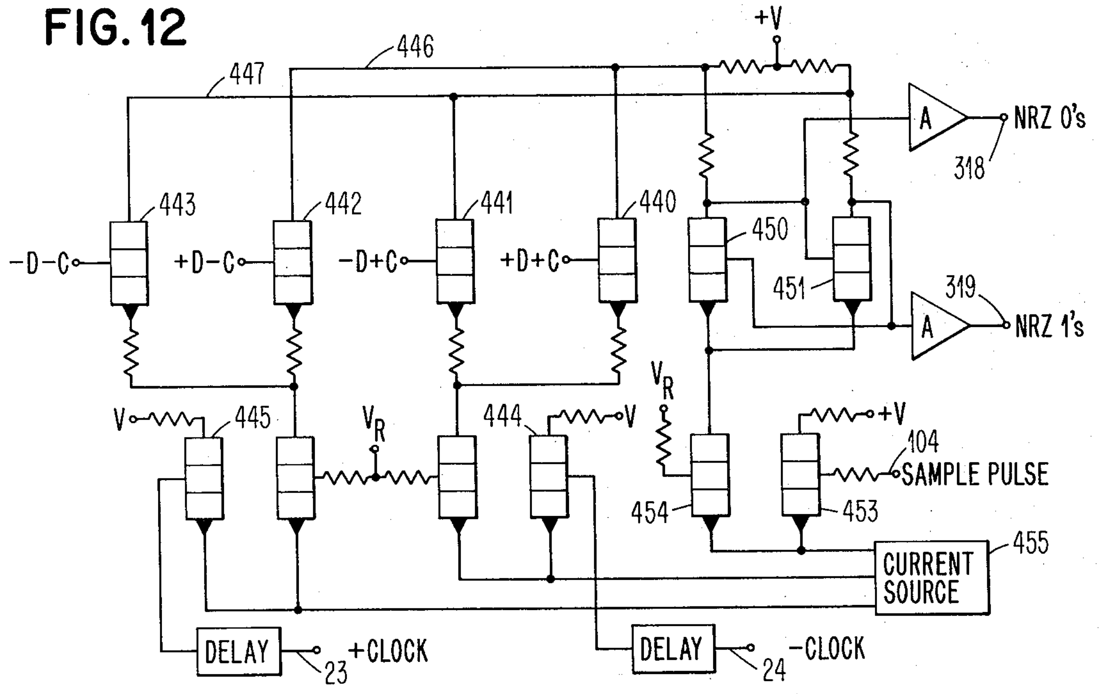
FIG. 12 is a simplified diagram of a data indicator constructed similar to the FIG. 11 illustrated apparatus.

The output signals from NRZ alternate cycle integrators 30, 31 are supplied to phase error indicator 302 shown in FIG. 11. This indicator analyzes the amplitudes after each detection period for determining the phase relationship of the data signal to the clock signal, either PE or run-length in accordance with format select circuits 301. The synchronously demodulated data signal integration amplitudes indicate phase relationships, hence, indicate both data and phase-errors. As shown in FIG. 1, the outputs of the various integration means shown in FIG. 2 are supplied via amplifiers (not shown) directly to the phase error indicators and data compare 40A rather than being initially supplied and combined in analog-OR's 38 and 38' as shown in FIG. 2. That is, the analog-OR functions are performed in the phase error indicator 302 and the data compare 40A as shown in FIG. 12. This arrangement is a slight design improvement over that shown in the FIG. 2 arrangement for facilitating use of integrated circuits. Both phase error indicator 302 and data compare 40A have all identical type transistors (NPN) in the same manner that the alternate cycle integrator shown in FIG. 7 may be in integrated circuit form. The +D, +C, and other signals are shown taken from amplifiers 210 and 211, respectively, in FIG. 7 for being supplied to phase error indicator 302 and to data compare 40A in the same manner as indicated by the lines labeled +D+C, +D−C, −D+C, and −D−C.

Referring next to FIG. 11, a simplified representation of phase error indicator 302 is shown. Note that the operation of this phase error indicator is similar to the comparator latch 40 shown in FIG. 4. This phase error indicator output signal is timed in the same manner as data compare 40A: that is, pulse generator 45A responds to all transitions on the plus clock on line 23 and supplies sample pulses over line 104 to both circuits. Such transitions are time coincident to the FIG. 1 line 25 positive transitions.

In FIG. 11, the phase comparison for determining phase error within circuits 399 is continuously actuated by ±delayed clock signals. The comparison result signals are captured in triggerable phase error latch 391, 392 by the sample pulse. Circuit 399 contains two differential amplifiers. One differential amplifier 420, 421 compares −D+C with +D+C and the other differential amplifier 422, 423 compares −D−C with +D−C. The collector of the −D+C transistor 420 is connected to the collector of −D −C transistor 422, and the collector of the +D+C transistor 421 is connector to the collector of the +D−C transistor 423. Each differential amplifier is gated, as later described, on and off by a delayed clock input. The collector OR function performed by connecting the differential outputs together simplifies the phase comparator circuitry and performs the previously mentioned analog-OR functions.

Figure 11A:
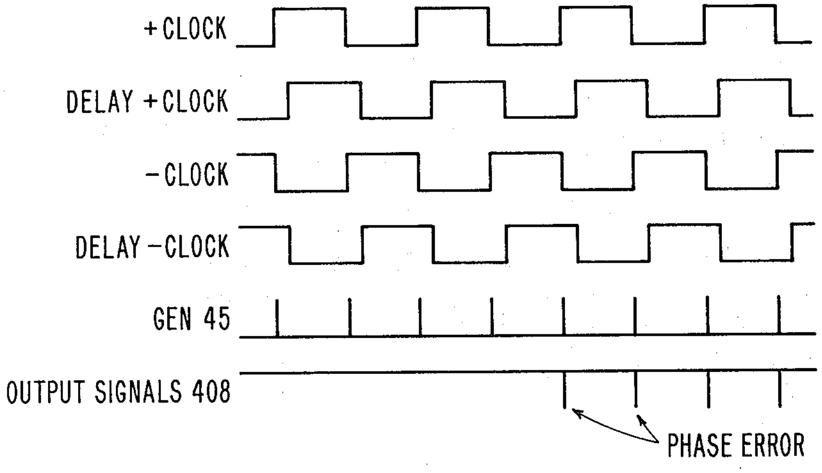
FIG. 11A is a timing diagram showing the clocking of the FIG. 11 apparatus.

The sample pulse actuates comparison at the end of each detection period by switching current conduction from transistor 391 to transistor 392. The base portion of transistor 392 is connected to a voltage reference. Current source 394 supplies a constant current via resistor 395 to differentially connected transistor pair 391, 392. These two transistors operate in a switching mode such that when transistor 392 becomes current conductive, the phase error latch, which includes cross-coupled latch transistors 397 and 398, is set to a signal state in accordance with the signals from comparison circuit 399. The timing relationships of circuit operation are shown in FIG. 11A.

Turning again to circuit 399, if either one of a pair of gating transistors 401 and 402, are current conductive, at sample time, there is no phase error. Where there is a phase error, the voltages at the bases of 401 and 402 have both shifted negative enough to cause differentially connected transistor 404 to become current conductive, which causes junction 405 to become relatively negative. This relatively negative signal sat sample time causes transistor 398 to be driven into current nonconduction, maintaining a relatively positive potential at junction 406 and the relatively negative potential on junction 405. The negative potential on junction 405 is transmitted via noninverting isolating amplifier 428 to transistor 407 causing a relatively negative voltage to be supplied over terminal 408 for indicating a phase error condition.

A received phase error reference voltage sets the phase error reference; the voltage travels through resistor 410 to current-dividing differentially connected transistors 411 and 412. When error reference voltage is relatively negative, transistor 411 is more current nonconductive permitting transistor 412 to be more current conductive. This setting provides a relatively negative voltage potential at junction 413, thereby making transistor 404 less current conductive. As the conductivity of transistors 411 and 412 is adjusted, the sensitivity of transistor 404 to the current conductiveness and nonconductiveness of gating transistors 401 and 402 is varied. Hence, the amount of phase error to be detected by phase error indicator can be varied via the voltage supplied through resistor 410. The less transistor 412 is conductive, the more sensitive the phase error indicator is; that is, circuit 302 supplies a phase error indicating negative signal for smaller phase shaft. As transistor 412 becomes more current conductive, the greater the phase-shift threshold before a phase error is indicated. This action will become apparent from the ensuing discussion on the cooperative action between matched circuits 411–412, 420–421, and 422–423. The resistors in these circuits are matched. Also, resistors 439 are matched.

Next, comparison of the various integrated signals is described as performed by transistors 420, 421, 422, and 423. These transistors selectively actuate transistors 401 and 402 in accordance with the amplitudes of the integration signals as timed by delayed ±clock signals. +Clock signal 23 is delayed a short amount by delay circuit 433 to provide delayed +clock signal of FIG. 11A to actuate timing gate transistor 430 to the current conduction state. This action turns off transistor 430A and makes phase comparison transistors 420 and 421 active. Note there is a continuous comparison being made between the −D+C and the +D+C signals from integrators 30, 31 during the +clock delayed phase. If the two integrations are substantially dissimilar (phase okay), then either transistor 420 or 421 will be much more current conductive than if the integrated signals −D+C, +D+C are equal. If either one is heavily current conductive, then the differential voltage between junction 425 and 426 will be large, with junction 425 being much more positive than junction 426, or vice versa. This relative positive voltage at the base of either transistor 401 or 402 causes one or the other to be current conductive to produce a phase okay condition. On the other hand, the differential voltage between (426 and 425) will be small when −D+C and +D+C are differentially approaching one another. This condition shifts both junctions 425 and 426 sufficiently negative to cause both transistors 401 and 402 to be substantially nonconductive. This action causes current to flow through phase error reference transistor 404, making it current conductive. It being current conductive, junction 405 becomes negative to supply a phase error signal to terminal 408.

In a similar manner, the integrated amplitudes +D−C and −D−C are supplied to transistors 422 and 423 which are respectively effectively connected in parallel circuit to transistors 420 and 421. Transistors 422 and 423 are employed in a comparison operation during the negative clock phase as determined by the −clock signal received over line 24. Delay circuit 434 delays the clock to supply the delay −clock signal of FIG. 11A to actuate transistor 431 to the current conductive state. This action causes clamp transistor 431A to become current nonconductive, whereby current flows through transistor 431 and either one or both of transistors 422, 423; as explained for transistors 420 and 421.

Latch 397, 398 is not actuated for actually completing the resultant comparison for indicating phase okay or phase error until pulse generator 45 (FIG. 1) has supplied its sample pulse over line 104, thence to transistor 391. When pulse generator 45 supplies its pulse to line 104, transistor 391 becomes current nonconductive for the duration of the sample pulse. This action causes transistor 392 to become current conductive, thereby activating latch 397, 398 for temporarily indicating phase okay or phase error on terminal 408, as above described. Referring to FIG. 11A, generator 45 sample pulses are shown to occur before the delay clocks, respectively, have changed from the positive to the negative or inactive states. This timing selection is critical in that the delayed ±clock signals allow the integrators 30, 31 to complete the integration detection before a phase comparison is completed in latch 397, 398. While circuit 399 is continually comparing phase, the latch 397, 398 is only activated during sample pulse durations immediately following each detection period as indicated by the change in state of the plus or minus clock signals. Thus, the output signals of integration means 33 and 33′ are compared in the phase error indicator 302 in the same manner that the analog-OR's 38 and 38′ supply these same signals to comparator latch 40 for comparison. Junctions 425 and 426 correspond to the analog-OR's 38 and 38′ of FIG. 2 and FIG. 7.

The operation of data compare 40A is best understood by referring to FIG. 12, wherein the +D+C integration signals are supplied to compare transistor 440, −D+C is supplied to compare transistor 441, the +D−C integration signal to transistor 442, and the −D−C integration signal to transistor 443. The timing signals of FIG. 11A indicate circuit 40A operation.

In the operation of data compare 40A, the comparison circuits are the same as described for circuitry 399 illustrated in FIG. 11. ±clock signals, respectively on lines 23 and 24, are delayed to the base electrodes of transistors 445 and 444, respectively, which actuate current conduction for com parison of the integrated signals to supply signals respectively to junctions 446 and 447. Junction 446 receives the signals of the plus clock actuation for ±data, respectively, while junction 447 receives the integrated signal during the −clock phase of ±data. Clock phases are defined as active when a positive polarity occurs (−clock being a positive polarity indicates −clock phase, etc.). The signal amplitudes on junctions 446 and 447, in turn, are supplied to latching circuit, including cross-coupled transistors 450 and 451. This circuit compares favorably with circuit 40 of FIG. 2 and FIG. 4. Latch 450, 451 is actuated to signal determination condition from a power supply disconnected condition by receiving the sample pulse over line 104 to turn off transistor 453. This action allows latch actuating transistor 454 (compare with transistor 46 of FIG. 2) to current conduction for exchanging current between current source 455 and +V. Actuation of the latch is as previously described.

The latch conditions indicating a binary 1 or 0 are supplied through a pair of amplifiers to output lines 318 and 319 for further processing by post detection processing circuits 303, as will be described, as well as to format detection circuit 314, as previously alluded to.

Returning now to FIG. 1, circuits 303 include output latch 51A corresponding to latch 51 of FIG. 2. This latch is used to reconstruct the NRZI limited data input signal. That is, latch 51A remembers the polarity of the data signal from the immediately previous detection period. A change in state at the output of latch 51A indicates the polarity of data has changed from what it was the previous detection period. Therefore, a transition at the output of the latch is recognized as a binary one, while no transition is recognized as a binary zero. In the case of run-length limited signal detection, which is a form of NRZI, latch 51A post detection processor transfers the appropriate 1's and 0's signals through AND's 347, 348, 349, and 350, thence over lines 351 and 352 to skew buffers 304. When phase-encoded recording is being used, 1's and 0's signal outputs from data compare 40A are gated directly through post detection processing circuit AND's 347 and 348 to skew buffer 304. With this, connection NRZ 1's from data compare 40A are transmitted to SKB 304 as PE 0's; while NRZ 0's are transmitted as PE 1's. This inversion enables hardware sharing between PE and NRZI modes in data processing circuits not shown nor described in this application. At the output terminals of such data processing, the PE signals are again restored to the correct data indication.

During the PE mode of readback, switch 339 of format select circuits 301 is set to the V1 terminal. V1 is applied to the reset terminal of BT 51A, keeping it in the reset state. This action keeps AND's 347 and 348 continuously enabled, while disabling AND's 349 and 350. Hence, the PE signals are supplied directly through the AND circuits without modification, except for the above-noted data representation inversion.

Figure 1A:
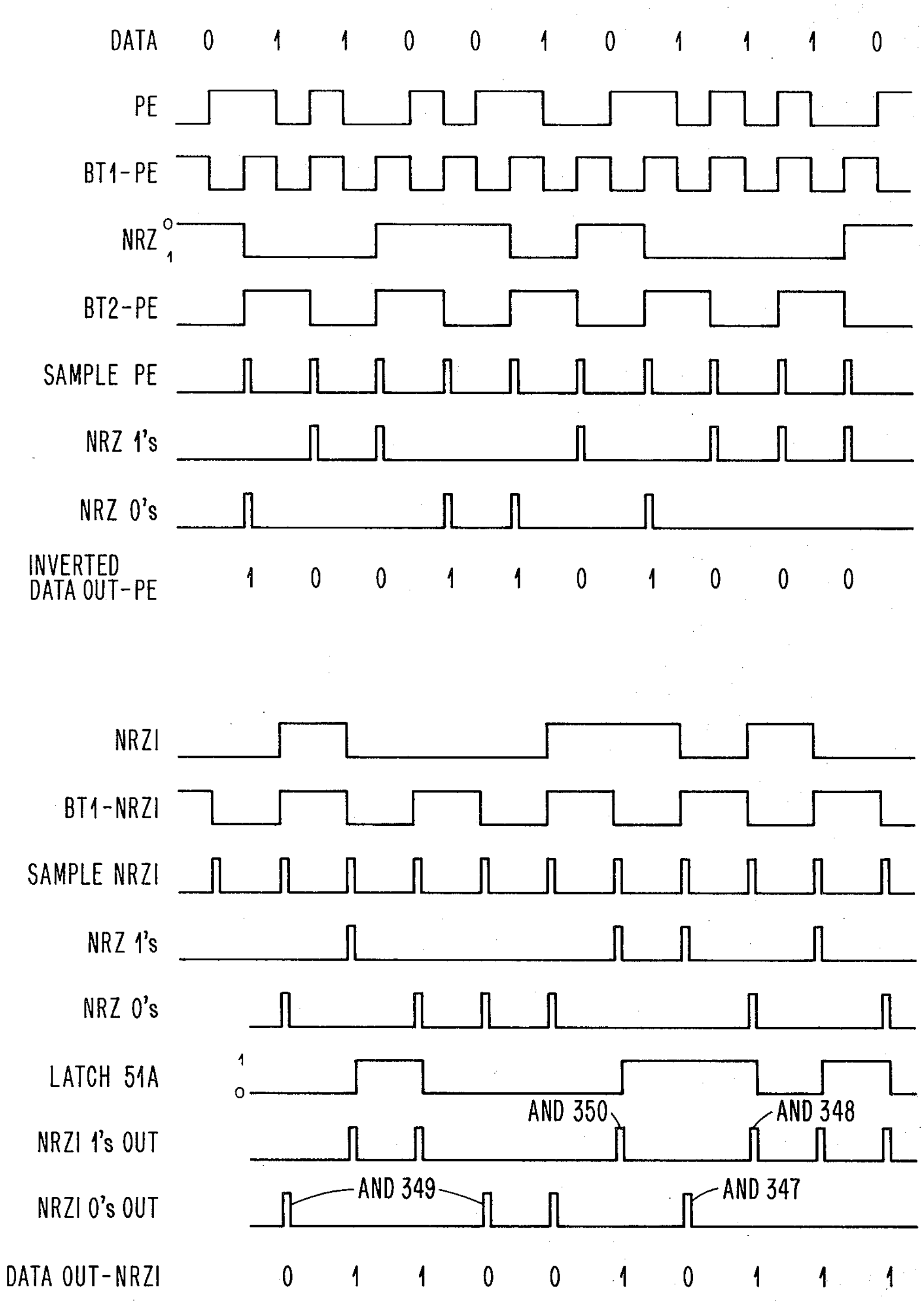
FIG. 1A shows a set of idealized signals illustrating the operation of FIG. 1.

To convert the NRZ 0's and 1's to NRZI, as above stated, switch 339 is connected to terminal R which effectively disengages that reset input, putting the control of BT 51A under the NRZ 1 and 0 pulses (FIG. 1A). The NRZ 1's reset BT 51A at their trailing edges while NRZ 0 pulses set BT 51A at their trailing edges. Remember that a binary 1 is indicated by change in state between two successive detection periods; when BT 51A indicates one binary and the NRZ pulse is another binary, an NRZI 1 is sent over line 351. AND 348 is responsive to an NRZ 0 on line 319 and to BT 51A indicating an NRZ 1 to emit a 1 pulse. AND 350 responds to the BT 51A in the 0 state and an NRZ 1 to emit a 1's signal. The output NRZI 0's respectively travel from AND's 347 and 349. In such cases, BT 51A being in the 1 state and an NRZ 1 on line 318 activates AND 347 to emit a 0's pulse on line 352. Similarly, AND 349 is responsive to BT 51A being in the 0 state and an NRZ 0 signal on line 319, which is a pulse, to supply a pulse over line 352.

Figure 13:
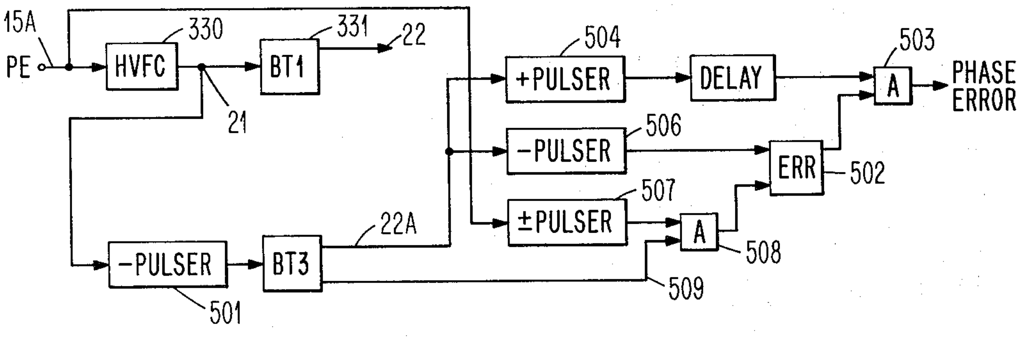
FIG. 13 is a simplified diagram of a wavelength type phase error detector.

The last control in format control circuits 301 is switch 340 which connects PE phase error detection circuits 499 shown in FIG. 13 to SKB 304 for deskewing phase error indicating bits along with data bits as will become apparent in the subsequent description.

Figure 13A:
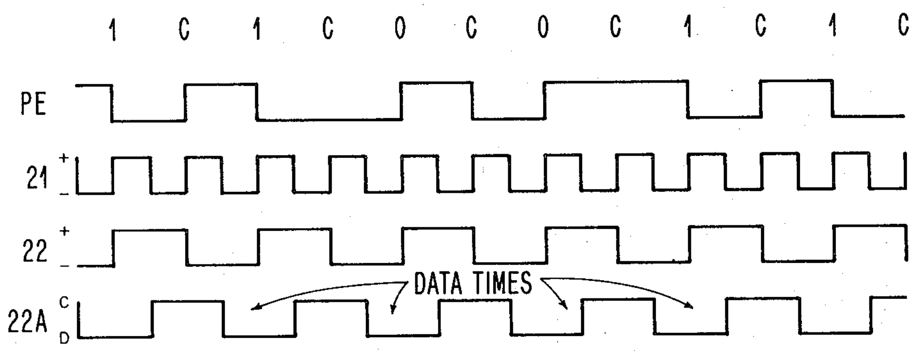
FIG. 13A is a timing diagram using idealized signals to illustrate operation of the FIG. 13 illustrated apparatus.

In addition to detecting and indicating possible phase errors by a combination of alternate cycle integrators 30 and 31 and phase error indicator 302, when detecting phase encoded data only, phase error detection circuit 499 combines a phase encoded data signal from line 15A with a signal derived from VFC 20A to indicate phase errors by detecting absence of data transitions. Referring now to FIGS. 13 and 13A, a typical PE signal is shown at the top wherein the letter "C" indicates clock times denoting boundaries of adjacent bit cells with the 1's and 0's indicating the data indicated at data time "D." In PE recording, a transition is required at each data time. By deriving a signal 22A wherein the positive portions represent clock times and the negative portions represent data times, the circuit illustrated in FIG. 13 looks for transitions during such data times. If a transition occurs, then there is a phase okay signal generated. If no signal is detected during negative portions of signal 22A, a phase error is indicated. By adjusting the duration of the negative portion of signal 22A, using known techniques, the phase error window can be adjusted. That is, the threshold at which a phase error is indicated is easily controllable. Phase error gating signal 22A is derived from clock signal 21 via cell center clock 22. As seen in FIG. 13, the PE signal on line 15A is supplied to HVFC 330, as above described. Cell center clock 22 is generated by BT1 331 at every positive-going transition of clock signal 21. That is, each time clock signal 21 goes positive, cell center clock signal 22 has a change in state. To generate phase error window generating signal 22A, a change in state occurs each time clock signal 21 goes negative. This provides a 90° phase shift between signals 22 and 22A for generating the data time windows. In a similar manner, negative pulser 501 is responsive to the negative-going transition of clock signal 21 to trigger BT 3 to its opposite state generating signal 22A and the complement of signal 22A at their respective output terminals. Phase error latch 502 momentarily stores signal conditions of the relationship of the signals shown in FIG. 13A. AND circuit 503 is responsive to a first signal state of latch 502 to pass the pulser 504 output signal as a phase error indicating signal. Pulser 504 emits a pulse each time signal 22A goes positive. Examination of signal 22A indicates that each positive-going transition signifies the end of a data time. Hence, when latch 502 is in its first state, when pulser 504 is emitting a pulse, no transition has been detected by the FIG. 13 illustrated apparatus.

The beginning of the data time window is signified by negative pulser 506 responding to the negative-going transition of signal 22A to set latch 502 to its first signal state. PE signal on line 15A drives plus or minus pulser 507 to emit a pulse upon either a positive or negative transition. Note that pulser 507 will supply a pulse for all data and block transitions. To eliminate the clock transitions, AND 508 is enabled by the signal on line 509, which is the complement of signal 22A. Accordingly, that signal during data times will be positive allowing the pulses from pulser 507 (all positive) to be supplied to reset latch 502 to a second signal state thereby disabling AND 503 and supplying a phase okay signal by not emitting a pulse at the end of the data time window.

While the invention has been particularly shown and described with respect to preferred embodiments thereof, it will be understood by those skilled in the art that various changes in form and detail may be made therein without departing from the spirit and scope of the invention.

What is claimed is:

1. A data detector, including in combination:

means for receiving an amplitude-limited signal having first and second signal states;

format means indicating that said signal represents data in a given format out of a plurality of possible formats;

predetection processing and format selection means having a portion for each of said possible formats and responsive to said format means to activate a given portion to pass signals therethrough, said given portion supplying signals in an NRZ limited signal format corresponding to data represented in said given format;

timing means responsive to said NRZ limited signal to generate a clock signal indicative of pairs of first and second successive sample times for said limited signal;

first and second integration means each supplying an integrated signal, said first and second integration means being responsive to said clock signal respectively during said first and second sample times to integrate said limited signal, respectively, during said first and second sample times, each of said integration means being respectively nonresponsive to said limited signal at all other times;

reference signal state recovery means in each said integration means for altering the integrated signal therein when the respective integration means are nonresponsive to said limited signal for altering each integrated signal toward a reference signal value;

separate means for combining said integrated signals from said first and second integration means and for combining said integrated signals from said third and fourth integrator means; and output means including post detection processing and format selection means having a portion for each of said possible formats and jointly responsive to said combined signals and to said format means for indicating data in accordance with the signal relationships therebetween and in accordance with said given format.

2. The subject matter of claim 1 wherein said clock signal has first and second signal states respectively indicating said first and second successive sample times;

integrator clocking means electrically interposed between said timing means and each said integration means for selectively activating same in accordance with the signal states of said clock signal, a first integrator clocking means being responsive to said clock signal to actuate said first and third integration means to receive said limited signal and to respectively integrate said first and second signal states thereof and simultaneously actuating said second and fourth integration means to alter the integrated signals therein toward a reference state during substantially all of said first sample times; and said integrator clocking means being further responsive to said clocking signal being in said second signal state to cause said second and fourth integration means to be responsive to said limited signal and simultaneously causing said first and third integration means to alter the integrated signal toward a reference signal state during substantially all of said second sample time.

3. The subject matter set forth in claim 1 wherein said output means includes an amplitude voltage comparator responsive at predetermined times within said sample times to same combined signals for providing a binary output signal for indicating which of the two combined signals has the larger amplitude.

4. The subject matter set forth in claim 3 wherein said comparator means includes a bistable latch having first and second inputs for respectively switching the latch between first and second stable signal states;

strobe means connected to said latch for selectively biasing said latch to an inactive circuit condition and further biasing said latch to an active circuit condition for a short period of time at the beginning of each of said sample times such that the combined signals bias the first and second inputs respectively for causing said latch to rapidly switch to one of said first or second signal stages during said short period.

5. Predetection integration for use with amplitude limited signals, a first-limited signal being supplied along a first line and a second limited signal being supplied along a second line;

timing means responsive to one of said limited signals for generating a clocking signal having first and second signal states of respective durations substantially equal to predetermined durations of corresponding first and second signal states of said one limited signal;

predetection processing means receiving said first and second limited signals for converting same to corresponding first and second intermediate data representing signals;

control means operating said predetection processing means for varying the conversion and indicating format of said first and second limited signals such that said predetection processing means conversion varies in accordance with such indicated format;

first integration means jointly responsive to said first intermediate signal being in a first signal state and to said clock signal being in a first signal state to integrate time duration of said intermediate signal being in said first signal state and being further responsive to said clock signal being in a second signal state to alter the integrated signal toward a reference state at a rate slightly greater than said rate of integration;

second integration means jointly responsive to said first intermediate signal being in said first signal state and to said clock signal being in said second signal state to integrate the duration of said intermediate signal being in said first signal state and being further responsive to said clock signal being in said first signal state to alter the integrated signal toward a reference value at a rate slightly greater than the rate of integration;

third integration means jointly responsive to said second intermediate signal being in a second signal state and to said clock signal being in said first signal state to integrate the duration of said second intermediate signal being in said second signal state and being further responsive to said clock signal being in said signal state to alter the integrated signal toward a reference state at a rate slightly greater than the rate of integration;

fourth integration means jointly responsive to said second intermediate signal being in said second signal state and to said clock signal being in said second signal state to integrate the duration of said second intermediate signal being in said second signal state and being further responsive to said clock signal being in said first signal state to alter the integrated signal toward a reference state at a rate slightly greater than the rate of integration;

signal combining means respectively combining the integrated signals from said first and second integration means for supplying a first combined signal indicating duration of the first signal state in said first intermediate signal and further combining integrated signals from said third and fourth integration means for supplying a second combined signal indicating the duration of said second intermediate signal being in said second signal state; and post detection processing means responsive to said control means for altering said combined signals indicating data in accordance with said format wherein at least one of said conversions includes supplying said signals without altering the timing thereof.

6. The subject matter set forth in claim 5 wherein said post detection processing circuit comprises:

a binary latch having zero and one signal indicating output signal states, a set input receiving said first combined signal, and a reset input receiving said second combined signal;

first, second, third, and fourth AND circuit means, each supplying output signal, said first and second AND circuit means receiving said one output signal state of said binary trigger, said third and fourth AND circuit means receiving the zero output of said binary trigger, said second and third AND circuit means respectively receiving said first combined signal, said first and fourth AND circuit means receiving said second combined signal;

means combining the output signals of said second and fourth AND circuit means to supply a first data indicating signal and means combining the output signals of said first and third AND circuit means to supply a second data indicating signal;

said control means selectively actuating said binary latch to said reset state; and said predetection processing circuits including phase demodulating means and responsive to said control circuit means to phase demodulate said first and second limited data signals whenever said control circuit is holding said binary trigger to said reset state.

7. The method of processing an amplitude-limited input digital signal having plural signal states and selectively changing signal states at the ends of successive time periods of the signal and representing data in accordance with one of a plurality of predetermined signal formats;

the improved method steps including:

first, selectively altering said signal-state changes to generate an NRZ input signal from one of said signal formats;

separately integrating said plural state portions of said NRZ input signal in each successive time period;

comparing said separately integrated signals at the end of each time period and supplying output signals in accordance with the signal relationships of said integrated signals;

generating two independent integrated signals for each signal state in alternating successive time periods and returning said independently integrated signals toward a reference value during time periods intermediate said alternating time periods;

combining the two independently integrated signals for each signal state and supplying each combined signal as said integrated signal; and selectively altering said integrated signal to indicate different data in accordance with said first selective alteration and with said one signal format.

8. The method of claim 7 wherein said input digital signal may have more than one state change in each time period, the improved method further including the steps for generating said NRZ signal for a second one of said formats of:

generating a reference digital signal having predetermined cyclic signal-state changes related to said input digital signal-state changes;

logically combining said input and reference digital signals to produce a third digital NRZ signal having fewer state changes per time period than said input digital signal;

then integrating said third digital signal in place of integrating said input digital signal; and supplying said integrated signal as an output signal without said selective alteration.

9. A digital signal detector including in combination:

data signal receiving means including format control means selectively altering received signals to generate intermediate first and second digital signal-representing data signals;

first and second integrators, each integrator having + and − integration circuits, said integrations respectively receiving said first and second digital signals;

clock means supplying digital clock signals to said integration circuits for alternately activating said integration circuits to integrate said digital signals to integrated signals;

means receiving said integrated signals and combining same in a predetermined manner and responsive to one of said clock signals to supply output signals indicative of the signal relationships of said intermediate digital signals as represented by said integrated signals; and data output means including data representing altering means selectively altering said integrated signals to represent data in accordance with said format control means and said data signal receiving means.

10. The detector set forth in claim 9 wherein said receiving means includes two differential comparison circuits, two summing means for each said comparison circuits, and each said summing means combining two of said integrated signals and supplying such combined signals to the respective differential comparison circuit, said combining means activating both said differential comparison circuits to supply an output signal each time said clock signals change signal states;

one of said comparison circuits supplying a data indicating signal as its output signal; and data processing means receiving said data indicating signal for processing same and responsive to said output signal from another of said comparison circuits to selectively alter said processing in accordance therewith.

11. Synchronous demodulation employing integration, including the following steps in combination:

supplying a timing signal;

supplying data signals to be synchronously demodulated with respect to said timing signals;

combining said timing signal and said data signals to generate plural distinct signal amplitudes including integrating said data signals with respect to said timing signals;

in timed relation to said timing signal, combining said plural distinct signal amplitudes into two output signals timed by said timing signal, one output signal representing said data signal in a synchronous demodulated relation to said timing signals and another output signal indicating an error status of said data signal; and combining said two output signals in a predetermined manner to supply a correct output data signal.

12. An electrical signal processing circuit, including in combination:

means for differentially receiving a signal to be processed;

means for selectively altering said differentially received signal to supply an intermediate differential signal;

a differentially operating timing circuit for defining successive time periods of signal processing;

first and second differentially connected switches each with first and second differential inputs and outputs differentially receiving said signal to be processed, and said switches being alternately actuated in said successive time periods between electrical current conductive and nonconductive states by said timing circuit and further responsive to said intermediate signal to alter one of said states;

integration signal storage means extending between said outputs of said differentially connected switches, respectively;

means for detecting electrical signals in said storage means in timed relation to said time periods; and means operatively associated with said selective altering means to selectively convert said detected electrical signals to a different data-indicating state.

13. A signal processing system for processing digital information-bearing signals of different character, means for reading recorded digital signals from a record media, the improved system including in combination:

first means indicating the character of said digital signals read from said record media;

second means responsive to said indication to convert said read digital signals to NRZ or NRZI intermediate signals, some of said intermediate signals being NRZ and others NRZI;

an NRZ data detector receiving said intermediate signals to supply detected NRZ 1 and 0 signals independent of said NRZ and NRZI types; and third means receiving said detected NRZ 1 and 0 signals and responsive to said indication to convert said NRZ 1's and 0's to NRZI 1's and 0's when said intermediate signals are NRZI type.

14. A readback system for a digital data recorder receiving signals from a record media which can represent digital information in one of a plurality of signal formats, amplitude-limiting means transferring said digital data signals as amplitude-limited signals to thereby represent information as a succession of signal-state changes;

the improvement including the combination:

control means indicating one of said plurality of signal formats;

predetection processor including logic circuits responsive to said indication to selectively convert said signals from said one format to an intermediate signal format representing information as a succession of signal-state changes different from said one signal format and to pass other signals from other formats without conversion;

a data detector responsive to said intermediate signals to supply detected intermediate 1 and 0 signals which may or may not represent information as recorded; and a post detection processor receiving said detected intermediate 1 and 0 signals and responsive to said indication to selectively further convert said detected intermediate 1 and 0 signals to signals having another succession of signal-state changes to truly represent recorded information while responsive to at least one of said indications not to further convert said detected intermediate 1 and 0 signals.

15. The readback system set forth in claim 14 wherein the record media includes format indicating signals, means for detecting said format indicating signals to actuate said control means;

timing means for timing said processors and said data detector;

the improvement further including in combination:

said timing means supplying a plurality of timing signals all of different frequencies;

means in said control means electrically interposed between said timing means and said data detector to select one of a plurality of timing signals and supplying said selected timing signal to said data detector in accordance with said indication.

16. The readback system set forth in claim 15 further including in combination:

phase error detecting means responsive to said amplitude-limited signals and to a given one of said timing means timing signals to indicate a phase error upon occurrence of predetermined timing relationships between said given one timing signal to signal a phase error;

means in said control means responsive to a given one of said indications to pass said signaled phase error; and means responsive to said signaled phase error and said further converted signals to supply output data signals.

17. The readback system set forth in claim 14 further including in combination:

timing means supplying first and second timing signals respectively indicating alternate successive periods to said data detector for timing same to supply plural detection signals in successive first and second alternate ones of said periods and supplying a sampling pulse at the end of each said periods, a succession of said detection signals indicating detected intermediate signals;

a first comparator portion in said data detector receiving said detection signals, comprising two differentially connected comparator transistor element circuits having an output and responsive to said first and second timing signals, respectively, to select said detection signals, a comparator latch circuit including cross-coupled transistor elements having a common emitter connection and having a given latch input, said comparator circuit outputs connected to said given latch input, a transistor element circuit connected to said common emitter connection and responsive to each said sample pulse to activate said comparator latch for supplying said detected intermediate 1 and 0 signals in response to predetermined amplitudes of said detection signals;

a second comparator portion in said data detector receiving said detection signals, comprising two second differentially connected comparator transistor element pair circuits having an output and responsive to said first and second timing signals, respectively, to select said detection signals, a second comparator latch circuit including second cross-coupled transistor elements having a common emitter connection and having first and second latch inputs, said second comparator circuit outputs connected to said first latch input;

a reference source connected to said second latch input for indicating an error threshold, means in said comparator latch responsive to said relative amplitudes at said inputs to supply an activating signal for triggering said comparator latch to an error-indicating state; and a second transistor element circuit connected to said common emitter connection and responsive to each said sample pulses to activate said second comparator latch for supplying either an error or error-free indicating signal for simultaneously supplied detected intermediate 1 and 0 signals.

18. A signal processing circuit for processing digital data signals of diverse types, each type representing data by different sequences of signal-state changes for representing the same data, the improvement including in combination:

means indicating which type of digital data signal is to be received;

predetection processing means responsive to said indication to selectively alter said sequences of signal-state changes to an intermediate sequence of signal-state changes;

a detector for detecting said intermediate signal-state changes to supply timed output signals indicating said intermediate signal-state changes; and post detection processing means responsive to said indication to selectively alter said timed output signals to supply output signals indicating said data.

19. A digital signal processing circuit, including in combination:

an alternate cycle integrator apparatus for receiving and detecting NRZ type digital signals and supplying output digital signals;

detection processing means connected to said apparatus for selectively exchanging signals therewith and selectively altering digital signals between NRZ type and another type;

a first phase error circuit receiving said output digital signal from said apparatus to indicate phase errors in said NRZ type signals;

a second phase error circuit responsive to said another type digital signals to detect and indicate phase errors in such another type digital signals; and timing signal generator means responsive to one of said digital signals to supply timing digital signals to said apparatus for enabling alternate cycle operation, said processing means and said phase error circuits to coordinate operation thereof with said one digital signal.

* * * * *